(12) United States Patent
Noto et al.

(10) Patent No.: US 9,437,169 B2
(45) Date of Patent: Sep. 6, 2016

(54) TOUCH PANEL CONTROL CIRCUIT AND SEMICONDUCTOR INTEGRATED CIRCUIT USING THE SAME

(71) Applicant: Synaptics Display Devices GK, Tokyo (JP)

(72) Inventors: Takayuki Noto, Tokyo (JP); Akihito Akai, Tokyo (JP)

(73) Assignee: Synpatics Japan GK, Tokoyo (JP)

( * ) Notice: Subject to any disclaimer, the term of this patent is extended or adjusted under 35 U.S.C. 154(b) by 0 days.

(21) Appl. No.: 14/567,386

(22) Filed: Dec. 11, 2014

(65) Prior Publication Data

US 2015/0170611 A1    Jun. 18, 2015

(30) Foreign Application Priority Data

Dec. 18, 2013   (JP) .................................. 2013-261039

(51) Int. Cl.
    *G06F 3/044*  (2006.01)
    *G09G 5/18*   (2006.01)
    *G06F 3/041*  (2006.01)

(52) U.S. Cl.
    CPC ................. *G09G 5/18* (2013.01); *G06F 3/044* (2013.01); *G06F 3/0416* (2013.01)

(58) Field of Classification Search
    CPC .................................. G09G 5/18; G06F 3/044
    See application file for complete search history.

(56) References Cited

U.S. PATENT DOCUMENTS

| | | | |
|---|---|---|---|
| 2009/0079718 A1* | 3/2009 | Nakagawa | G09G 5/18 345/204 |
| 2011/0304570 A1* | 12/2011 | Maeda | G06F 3/044 345/173 |
| 2012/0056835 A1 | 3/2012 | Choo et al. | |
| 2012/0161846 A1* | 6/2012 | Ningrat | G06F 3/044 327/365 |
| 2012/0256869 A1* | 10/2012 | Walsh | G06F 3/0416 345/174 |
| 2012/0287081 A1 | 11/2012 | Akai et al. | |
| 2012/0326734 A1* | 12/2012 | Cho | G06F 3/0416 324/684 |
| 2013/0036147 A1* | 2/2013 | Yan | H03H 15/00 708/300 |
| 2013/0069717 A1* | 3/2013 | Kim | G09G 3/36 330/9 |

* cited by examiner

*Primary Examiner* — Premal Patel
(74) *Attorney, Agent, or Firm* — Patterson + Sheridan, LLP

(57) ABSTRACT

A touch panel control circuit includes a drive circuit that drives Y electrodes of a touch panel, and a detection circuit that is connected to X electrodes and detects a capacitance value of an intersection capacitor. The drive circuit applies a plurality of pulses to the Y electrodes in a predetermined period. The detection circuit includes a switched capacitor circuit capable of operating with respect to an input signal from the X electrodes in synchronization with the plurality of pulses, and an integration circuit that is connected to an output of the switched capacitor circuit and operates in synchronization with the pulses. The switched capacitor circuit is allowed to operate as a filter, and the switched capacitor circuit is set to have characteristics which have a maximum gain at a direct current and a frequency of a corresponding pulse and in which the gain is suppressed at a frequency therebetween.

19 Claims, 14 Drawing Sheets

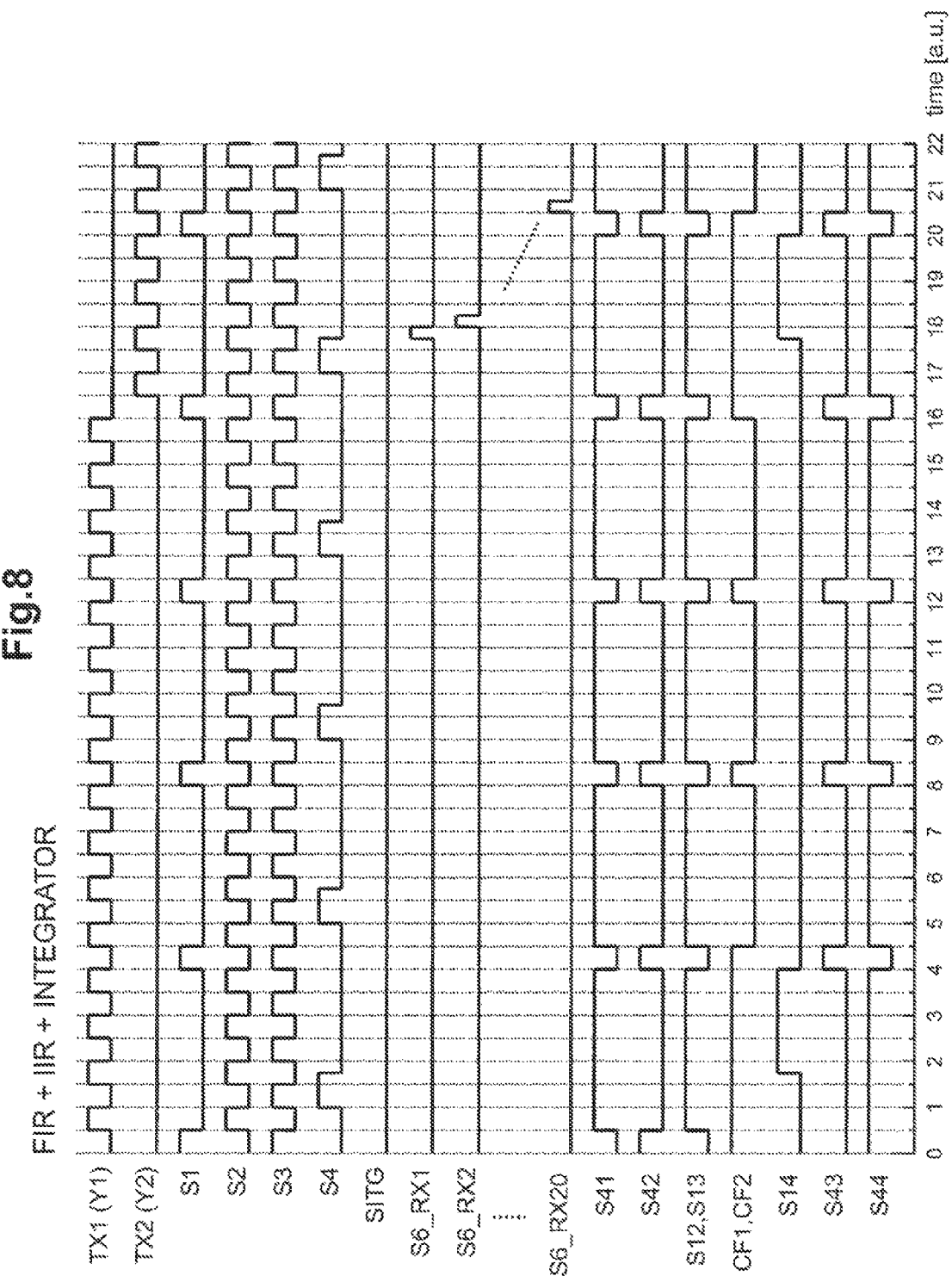

FIR FILTER

IIR FILTER

COMPOSITION OF FIR FILTER AND IIR FILTER

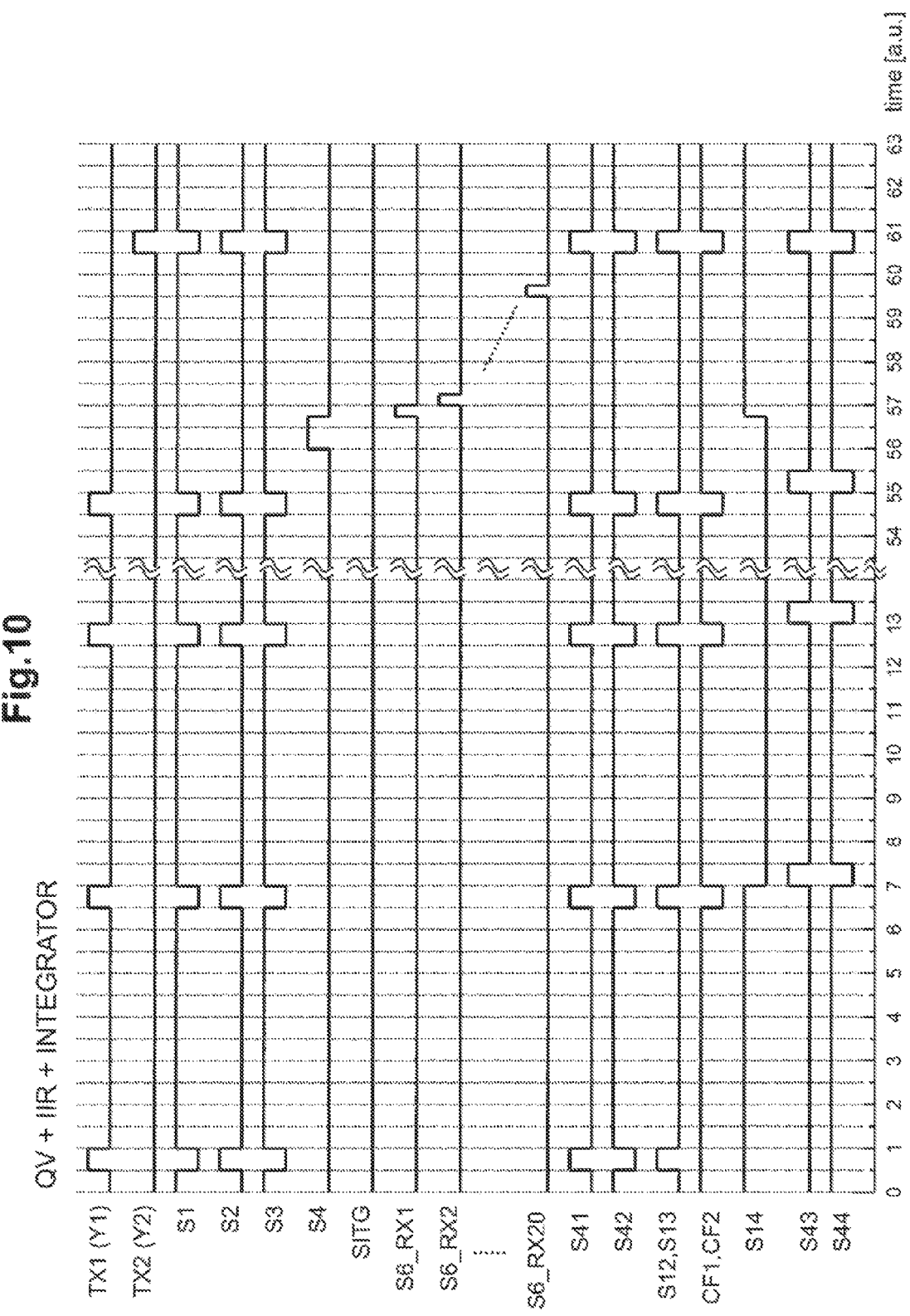

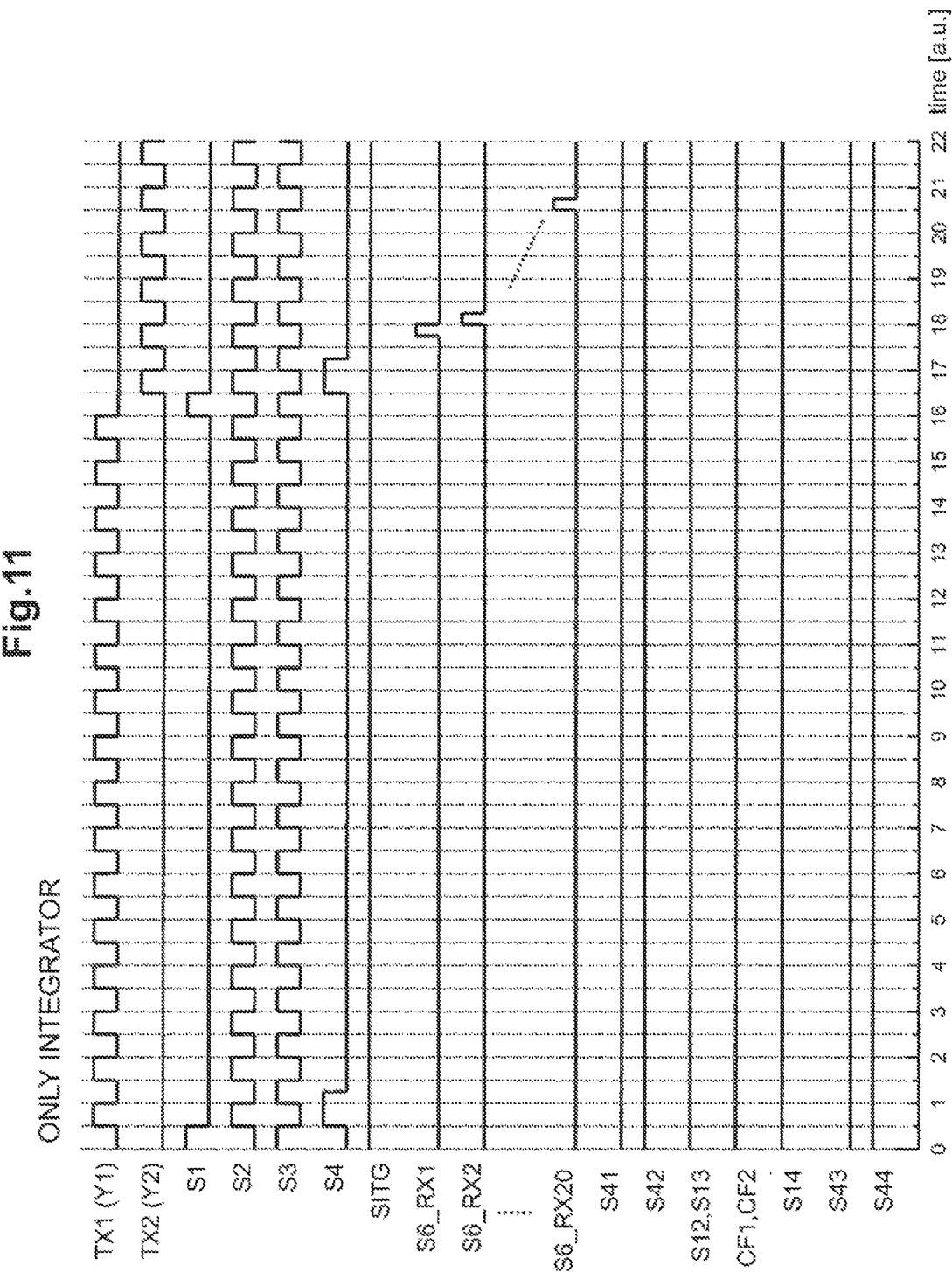

TOUCH PANEL CONTROL CIRCUIT AND SEMICONDUCTOR INTEGRATED CIRCUIT USING THE SAME

CROSS-REFERENCE TO RELATED APPLICATIONS

The present application claims priority from Japanese application JP 2013-261039 filed on Dec. 18, 2013, the contents of which are hereby incorporated by reference into this application.

BACKGROUND

1. Field of the Disclosure

The present invention relates to a touch panel control circuit and a semiconductor integrated circuit including the same, and particularly to, a touch panel control circuit which can be suitably used as a touch panel control circuit connected to a touch panel mounted in a display panel so as to overlap therewith.

2. Description of the Related Art

In a display panel that is used in a smart phone or a tablet terminal, a touch panel is mounted so as to overlap the display panel, and a user can operate an apparatus by touching (touching or tracing on) a display screen with a finger and the like. The touch panel control circuit is connected to the touch panel and detects coordinates on the display screen that is touched by the user. For example, in a mutual-capacitance type touch panel, a Y electrode as a drive electrode and an X electrode as a detection electrode are disposed perpendicular to each other with a dielectric interposed therebetween, and a capacitor (intersection capacitor) is configured in each intersection. If capacitance due to a finger or a hand is present in the vicinity of the intersection capacitor, mutual capacitance at the intersection is reduced from a capacitance value of the intersection capacitor by a division amount of electric charges that are charged by the capacitance by the finger or the hand. The touch panel control circuit detects at which intersection a variation of the mutual capacitance occurs and to what magnitude.

JP-A-2012-234474 and JP-A-2012-59265 disclose a technology for improving detection sensitivity or detection accuracy in a touch panel control circuit connected to the touch panel that is mounted in a display panel so as to overlap therewith.

In a touch panel control circuit that is disclosed in JP-A-2012-234474, a pulse-shaped AC drive voltage is repetitively applied to an intersection capacitor from a Y electrode, and electric charges corresponding to a capacitance value of the intersection capacitor at that time are transmitted and are accumulatively added by an integration circuit connected to the X electrode. In this manner, detection is performed. At this time, the amplitude of the drive AC voltage that is applied is increased to increase the signal level (amount of electric charges that are transmitted), and the timing between signals that drive the display panel is retarded in order to decrease a noise level that is affected by a display drive signal, thereby improving a signal/noise ratio (S/N ratio).

In a display device disclosed in JP-A-2012-59265, a display panel operating period and a touch sensing period are divided in a time division manner, thereby preventing a display drive signal having an effect on touch detection as a noise.

SUMMARY

One example provided herein includes a touch panel control circuit configured to connect to a touch panel comprising a first plurality of electrodes arranged in a first direction and a second plurality of electrodes arranged in a second direction, wherein the first plurality of electrodes intersect the second plurality of electrodes to form a plurality of intersection capacitors. The touch panel control circuit includes a plurality of drive circuits configured to drive the first plurality of electrodes. The touch panel control circuit also includes a plurality of detection circuits coupled to the second plurality of electrodes, each detection circuit of the plurality of detection circuits including a corresponding switched capacitor circuit and a corresponding integration circuit coupled to an output node of the corresponding switched capacitor circuit. The detection circuits of the plurality of detection circuits are configured to detect a plurality of capacitance values of the plurality of intersection capacitors. The drive circuits of the plurality of drive circuits are configured to apply a first number of pulses, the first number being at least two, to the first plurality of electrodes within a predetermined period. Each switched capacitor circuit is configured to receive an input signal from the second plurality of electrodes and to operate in synchronization with the pulses. Each integration circuit is configured to operate in synchronization with the pulses.

Another example provided herein includes a touch panel control circuit configured to connect to a touch panel comprising a first plurality of electrodes arranged in a first direction and a second plurality of electrodes arranged in a second direction, wherein the first plurality of electrodes intersect the second plurality of electrodes to form a plurality of intersection capacitors. The touch panel control circuit includes a plurality of drive circuits configured to drive the first plurality of electrodes by applying a first number of pulses to the first plurality of electrodes in a predetermined period. The touch panel control circuit also includes a plurality of detection circuits coupled to the second plurality of electrodes, each detection circuit of the plurality of detection circuits configured to detect a capacitance value of a corresponding intersection capacitor of the plurality of intersection capacitors. The touch panel control circuit further includes a sequence control circuit. Each detection circuit includes a first switched capacitor circuit that is coupled to each input terminal capable of being connected to the first plurality of electrodes, a first sample-and-hold circuit, a second switched capacitor circuit, a second sample-and-hold circuit, an integration circuit, and a third sample-and-hold circuit that retains an output of the detection circuit that are coupled in series. The first switched capacitor circuit includes a first operational amplifier in which a first positive side input is fixed to a first predetermined potential, a first integration capacitor that is coupled between a first negative side input and a first output of the first operational amplifier, a first switch that is coupled between the first negative side input and the first output of the first operational amplifier, and a second switch that is coupled between the input terminal and the first negative side input of the first operational amplifier. The second switched capacitor circuit includes a second operational amplifier in which a second positive side input is fixed to a second predetermined potential, a second integration capacitor that is coupled between a second negative side input and a second output of the second operational amplifier, and has a configuration in which a part or the entirety of a capacitance value is capable of being discharged by control, and a fourth switch that is coupled between an output of the first sample-and-hold circuit and the second negative side input of the second operational amplifier. The integration circuit includes a third operational amplifier in which a third positive side input is fixed to a predetermined potential, a third integration capacitor that is coupled between a third negative side input and a third output of the third operational amplifier, a third switch that is coupled between the third negative side input and the third output of the third operational amplifier, and a fifth switch that is coupled between an output of the second sample-and-hold circuit and the third negative side input of the third operational amplifier. The sequence control circuit is configured to control a timing of turning on or off the first switch, the second switch, the third switch, the fourth switch, and the fifth switch of the detection circuit and a timing of discharging a part or the entirety of the second integration capacitor in synchronization with a timing of outputting the pulses with respect to the drive circuit.

BRIEF DESCRIPTION OF THE DRAWINGS

FIG. 8 is a timing chart illustrating a first operation mode (FIR+IIR+integration circuit) of the detection circuit (single edge detection type) according to the second embodiment;

FIG. 10 is a timing chart illustrating a second operation mode (single edge detection type QV conversion+IIR+integration circuit) of the detection circuit according to the second embodiment;

FIG. 11 is a timing chart illustrating a third operation mode (only of a single edge detection type integration circuit) of the detection circuit according to the second embodiment;

DETAILED DESCRIPTION

Introduction

Figure 1:
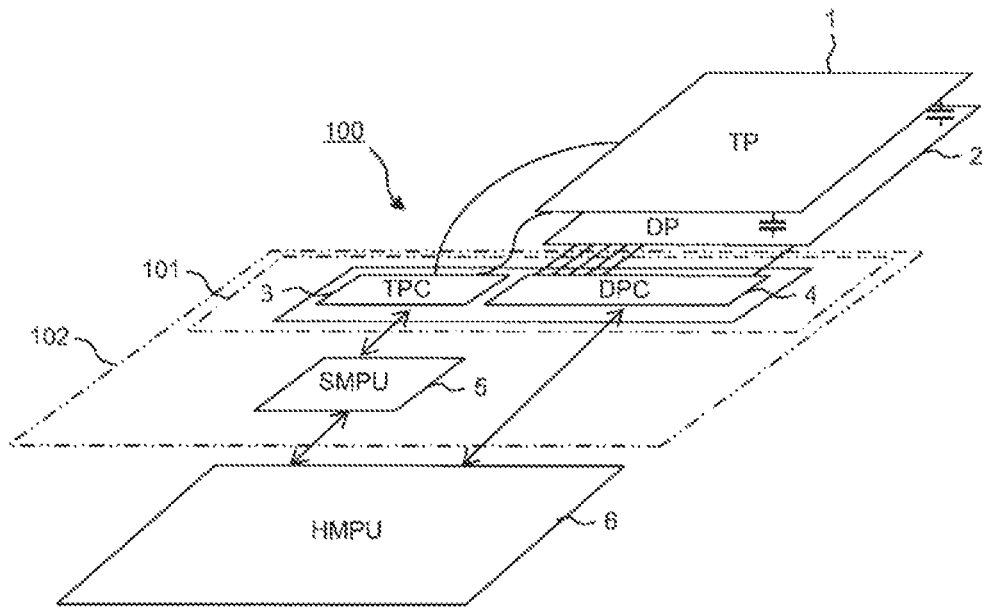
FIG. 1 is a block diagram illustrating an overall configuration of a display and input device that is an example of electronic equipment to which the invention is applied.

In JP-A-2012-234474 and JP-A-2012-59265, with regard to the touch panel control circuit connected to the touch panel that is mounted on the display panel so as to overlap therewith, attention is given to a display panel drive signal that becomes noisy with respect to touch detection. That is, noise that is mixed-in from the display panel can be reduced with respect to the intersection capacitor of the touch panel.

With regard to noise with respect to the intersection capacitor, it could be seen that in a relatively severe environment, the noise mixed-in from a finger and the like of the user that operates the touch panel is considerably large. For example, a potential variation from a ground level of an apparatus when the apparatus, on which the touch panel is mounted, is connected to a battery charger from a commercial power supply, or an effect from an electromagnetic wave which is present in an environment in which a power supply interconnection or the user receives the electromagnetic wave as an antenna, is mixed-in as noise. An integration circuit disclosed in JP-A-2012-234474 also has an effect of suppressing noise, but it can be seen that the noise suppressing effect is not sufficient in the above-described severe environment.

Means for solving the above-described problems are described below, but other problems and new features will become apparent from description of this specification and attached drawings.

An embodiment is as follows.

There is provided a touch panel control circuit including: a drive circuit which is capable of being connected to a touch panel in which an intersection capacitor is formed at respective intersections between a plurality of Y electrodes and a plurality of X electrodes, and which drives the Y electrodes; and a detection circuit which is connected to the X electrodes and detects a capacitance value of the intersection capacitor.

The drive circuit applies a plurality of pulses to the Y electrodes in a predetermined period. The detection circuit includes a switched capacitor circuit that is capable of operating with respect to signals input from the X electrodes in synchronization with the plurality of pulses, and an integration circuit which is connected to an output of the switched capacitor circuit and operates in synchronization with the plurality of pulses.

An effect obtained by the embodiment can be briefly described as follows.

That is, it is possible to obtain further higher noise suppressing effects in comparison to the noise suppressing effect of the integration circuit. To suppress noise, the switched capacitor circuit is capable of being allowed to operate as a switched capacitor filter (SCF). The switched capacitor filter performs a filtering operation with respect to signal charges, which are transmitted from the intersection capacitor to be detected a plurality of times in synchronization with the plurality of pulses, in synchronization with the signal charges, and thus it is possible to suppress noise of signals supplied to the integration circuit that operates in synchronization with the filter operation.

In JP-A-2012-234474 and JP-A-2012-59265, with regard to the touch panel control circuit connected to the touch panel that is mounted on the display panel so as to overlap therewith, attention is given to a display panel drive signal that becomes noise with respect to touch detection. That is, noise that is mixed-in from the display panel can be reduced with respect to the intersection capacitor of the touch panel.

With regard to noise with respect to the intersection capacitor, it could be seen that in a relatively severe environment, the noise mixed-in from a finger and the like of the user that operates the touch panel is considerably large. For example, a potential variation from a ground level of an apparatus when the apparatus, on which the touch panel is mounted, is connected to a battery charger from a commercial power supply, or an effect from an electromagnetic wave which is present in an environment in which a power supply interconnection or the user receives the electromagnetic wave as an antenna, is mixed-in as noise. An integration circuit disclosed in JP-A-2012-234474 also has an effect of suppressing noise, but it can be seen that the noise suppressing effect is not sufficient in the above-described severe environment.

Means for solving the above-described problems are described below, but other problems and new features will become apparent from description of this specification and attached drawings.

An embodiment is as follows.

There is provided a touch panel control circuit including: a drive circuit which is capable of being connected to a touch panel in which an intersection capacitor is formed at respective intersections between a plurality of Y electrodes and a plurality of X electrodes, and which drives the Y electrodes; and a detection circuit which is connected to the X electrodes and detects a capacitance value of the intersection capacitor.

The drive circuit applies a plurality of pulses to the Y electrodes in a predetermined period. The detection circuit includes a switched capacitor circuit that is capable of operating with respect to signals input from the X electrodes in synchronization with the plurality of pulses, and an integration circuit which is connected to an output of the switched capacitor circuit and operates in synchronization with the plurality of pulses.

An effect obtained by the embodiment can be briefly described as follows.

That is, it is possible to obtain further higher noise suppressing effects in comparison to the noise suppressing effect of the integration circuit. To suppress noise, the switched capacitor circuit is capable of being allowed to operate as a switched capacitor filter (SCF). The switched capacitor filter performs a filtering operation with respect to signal charges, which are transmitted from the intersection capacitor to be detected a plurality of times in synchronization with the plurality of pulses, in synchronization with the signal charges, and thus it is possible to suppress noise of signals supplied to the integration circuit that operates in synchronization with the filter operation.

1. Summary of the Embodiments

First, summaries of representative embodiments of the invention disclosed in the application will be provided. Reference numerals in drawings in parentheses referred to in description of the summary of the representative embodiments just denote components included in the concept of the components to which the reference numerals are designated and are not related to the reference numbers provided in the drawings.

[1] Detection Circuit Provided with SCF Synchronously Operating Before Integration Circuit A touch panel control circuit (3) according to representative embodiments disclosed in this application is capable of being connected to a touch panel (1) in which an intersection capacitor (Cxy) is formed at each of a plurality of intersections at which a plurality of Y electrodes (Y1 to YM) and a plurality of X electrodes (X1 to XN) intersect each other.

The touch panel control circuit (3) includes a plurality of drive circuits (30) that drive the plurality of Y electrodes, respectively, and a plurality of detection circuits (10) that are connected to the plurality of X electrodes, respectively, and detect a capacitance value of the intersection capacitor.

The drive circuits apply K (K is an integer of 2 or more) pulses to the Y electrodes in a predetermined period.

The detection circuits include switched capacitor circuits (11, 12) that are capable of operating with respect to an input signal from the X electrodes in synchronization with the pulses, and an integration circuit (13) that is connected to an output of the switched capacitor circuits and operates in synchronization with the pulses.

According to this, it is possible to obtain a further higher noise suppressing effect in comparison to the noise suppressing effect of an integration circuit. To suppress noise, the switched capacitor circuit is capable of being allowed to operate as a switched capacitor filter. The switched capacitor filter performs a filter operation with respect to signal charges, which are transmitted from the intersection capacitor to be detected a plurality of times in synchronization with the plurality of pulses, in synchronization with the signal charges. Thus it is possible to suppress the noise of signals supplied to the integration circuit that operates in synchronization with the filter operation. If frequency characteristics of the switched capacitor filter and the integration circuit are set to characteristics which have a maximum gain at a direct current and a sampling frequency and in which the gain is suppressed at a frequency therebetween, it is possible to further effectively suppress noise while suppressing deterioration of signals.

[2] L-Order FIR (fs)+IIR (fs/L)+Integration Circuit

In [1], the switched capacitor circuit includes a first switched capacitor circuit (11) to which the input signal is input, and a second switched capacitor circuit (12) to which an output of the first switched capacitor circuit is input and which outputs the input to the integration circuit.

The first switched capacitor circuit is capable of operating as a finite impulse response (FIR) filter of L-order (L is an integer of 1 or more) smaller than K which performs K times of sampling in the predetermined period.

The second switched capacitor circuit is capable of operating as a switched capacitor filter that performs K/L times of sampling in the predetermined period.

According to this, a frequency at which the gain of the FIR filter becomes zero and a sampling frequency with which a switched capacitor filter of a subsequent stage operates are capable of being matched to each other, and thus a pass frequency band of the switched capacitor filter of the subsequent stage can be suppressed through the characteristics of the FIR filter.

[3] FIR+IIR+Integration Circuit

In [2], the switched capacitor filter of the second switched capacitor circuit is an infinite impulse response (IIR) filter.

According to this, it is possible to further effectively suppress noise by combining frequency characteristics of the IIR filter and frequency characteristics of the FIR filter with each other.

[4] QV Conversion+IIR+Integration Circuit

In [1], the switched capacitor circuit includes a first switched capacitor circuit to which the input signal is input, and a second switched capacitor filter to which an output of the first switched capacitor circuit is input and which outputs the input to the integration circuit.

The first switched capacitor circuit is capable of operating as a QV conversion circuit which converts an amount of electric charges that are input K times in the predetermined period from the input signal to a voltage and, which outputs the voltage.

The second switched capacitor circuit is capable of operating as an IIR filter that performs K instances of sampling in the predetermined period.

According to this, it is possible to construct a filter in which an effect of a manufacturing deviation and the like is reduced. In cases [2] and [3], frequency characteristics at a previous stage and a subsequent stage are complementarily combined, and thus it is possible to realize overall satisfactory frequency characteristics. In contrast, in a case where the frequency characteristics of the previous stage and the subsequent stage deviate from designated values in different directions due to the effect of the manufacturing deviation and the like, the complementary relationship deviates, and thus there is a concern that a deviation from the designated values of the overall frequency characteristics may increase. In the case of [4], the previous stage and the subsequent stage have no complementary relation, and thus the effect of the manufacturing deviation and the like is reduced. In addition, the sampling frequency of the IIR filter can be set to as high as several times than in the case of [3], and thus it is possible to appropriately design the frequency characteristics of the IIR filter, and thus it is possible to further effectively suppress noise.

[5] Programmable (Single Edge Type)

In [1], the switched capacitor circuit includes a first switched capacitor circuit (11) to which the input signal is input, and a second switched capacitor circuit (12) to which an output of the first switched capacitor circuit is input and which outputs the output to the integration circuit.

The first switched capacitor circuit is capable of operating as an FIR filter of L-order (L is an integer of 1 or more) smaller than K which performs K times of sampling in the predetermined period, as a QV conversion circuit which converts an amount of electric charges that are input K times in the predetermined period from the input signal to a voltage and which outputs the voltage, or as an integration circuit which integrates an amount of electric charges that are input K times in the predetermined period from the input signal and which outputs a corresponding voltage once.

The second switched capacitor circuit is capable of operating as an IIR filter that performs K/L times of sampling in the predetermined period, or as an IIR filter that performs K times of sampling in the predetermined period.

The touch panel control circuit has a configuration capable of being set to allow the first and second switched capacitor circuits to perform which operation.

According to this, it is possible to set a configuration capable of allowing the detection circuit to perform the most appropriate operation among the configurations of [2] to [4] or other configurations in accordance with the environment in which the touch panel control circuit is mounted and used, and thus it is possible to cope with various noise environments.

[6] Integration Circuit (Dual Edge Type)

In [1], the switched capacitor circuit includes a first switched capacitor circuit (11) to which the input signal is input, and a second switched capacitor circuit (12) to which an output of the first switched capacitor circuit is input and which outputs the output to the integration circuit.

The first switched capacitor circuit is capable of operating as an integration circuit which integrates an amount of electric charges input from an input signal that is input in response to one edge of each of the K pulses in the predetermined period and an amount of electric charges input from an input signal that is input in response to the other edge in an inverted manner.

The touch panel control circuit has a configuration capable of outputting an output of the first switched capacitor circuit from the detection circuit by stopping the operations of the second switched capacitor circuit and the integration circuit.

According to this, it is possible to double the number of integrations performed in the same time period compared to an integration circuit of the related art, and thus it is possible to improve touch detection sensitivity.

[7] L-Order FIR (Dual Edge Type)+IIR (2 Fs/L)+Integration Circuit

In [1], the switched capacitor circuit includes a first switched capacitor circuit (11) to which the input signal is input, and a second switched capacitor circuit (12) to which an output of the first switched capacitor circuit is input and which outputs the output to the integration circuit.

The first switched capacitor circuit is capable of operating as an FIR filter of L-order (L is an even number of 2 or more) smaller than K which integrates an amount of electric charges input from an input signal that is input in response to one edge of each of the K pulses in the predetermined period and an amount of electric charges input from an input signal that is input in response to the other edge in an inverted manner.

The second switched capacitor circuit is capable of operating as a switched capacitor filter that performs 2 K/L times of sampling in the predetermined period.

According to this, the first switched capacitor circuit can improve the touch detection sensitivity similar to [6], and it is possible to allow the first switched capacitor circuit to have frequency characteristics having a noise suppressing effect as an FIR filter. In addition, as is the case with [2], a frequency at which a gain of the FIR filter becomes zero and a sampling frequency with which a switched capacitor filter of a subsequent stage operates can be matched to each other, and thus a pass frequency band of the switched capacitor filter of the subsequent stage can be suppressed through the characteristics of the FIR filter.

[8] FIR (Dual Edge Type)+IIR+Integration Circuit

In [7], the switched capacitor filter of the second switched capacitor circuit is an IIR filter.

According to this, as is the case with [3], it is possible to further effectively suppress noise by combining frequency characteristics of the IIR filter and frequency characteristics of the FIR filter with each other.

[9] QV Conversion+IIR+Integration Circuit

In [1], the switched capacitor circuit includes a first switched capacitor circuit (11) to which the input signal is input, and a second switched capacitor circuit (12) to which an output of the first switched capacitor circuit is input and which outputs the output to the integration circuit.

The first switched capacitor circuit is capable of operating as a QV conversion circuit which converts an amount of electric charges input from an input signal that is input in response to one edge of each of the K pulses in the predetermined period and an amount of electric charges input from an input signal that is input in response to the other edge to voltages in which one polarity is inverted and becomes equal to the other polarity, and which outputs the voltages.

The second switched capacitor circuit is capable of operating as an IIR filter that performs 2K times of sampling in the predetermined period.

According to this, as is the case with [6], it is possible to improve the touch detection sensitivity, and as is the case with [6], it is possible to construct a filter in which an effect of a manufacturing deviation and the like is reduced.

[10] Programmable

In [1], the switched capacitor circuit includes a first switched capacitor circuit (11) to which the input signal is input, and a second switched capacitor circuit (12) to which an output of the first switched capacitor circuit is input and which outputs the output to the integration circuit, and has a configuration which has at least two operation modes among first to sixth operation modes and which is capable of being set to operate in specified operation modes.

In the first operation mode, the first switched capacitor circuit is allowed to operate as an integration circuit which integrates an amount of electric charges that are input K times in the predetermined period from the input signal and which outputs a corresponding voltage once, operations of the second switched capacitor circuit and the integration circuit are stopped, and an output of the first switched capacitor circuit is output from the detection circuit.

In the second operation mode, the first switched capacitor circuit is allowed to operate as an FIR filter of L-order (L is an even number of 2 or more) smaller than K which performs K times of sampling in the predetermined period, and the second switched capacitor circuit is allowed to operate as an IIR filter that performs K/L times of sampling in the predetermined period.

In the third operation mode, the first switched capacitor circuit is allowed to operate as a QV conversion circuit which converts an amount of electric charges that are input K times in the predetermined period from the input signal to a voltage and outputs the voltage, and the second switched capacitor circuit is allowed to operate as an IIR filter that performs K times of sampling in the predetermined period.

In the fourth operation mode, the first switched capacitor circuit is allowed to operate as an integration circuit which integrates an amount of electric charges input from an input signal that is input in response to one edge of each of the K pulses in the predetermined period and an amount of electric charges input from an input signal that is input in response to the other edge in an inverted manner, operations of the second switched capacitor circuit and the integration circuit are stopped, and an output of the first switched capacitor circuit is output from the detection circuit.

In the fifth operation mode, the first switched capacitor circuit is allowed to operate as an FIR filter of L-order smaller than K which integrates an amount of electric charges input from an input signal that is input in response to one edge of each of the K pulses in the predetermined period and an amount of electric charges input from an input signal that is input in response to the other edge in an inverted manner, and the second switched capacitor circuit is allowed to operate as a switched capacitor filter that performs 2K/L times of sampling in the predetermined period.

In the sixth operation mode, the first switched capacitor circuit is allowed to operate as a QV conversion circuit which converts an amount of electric charges input from an input signal that is input in response to one edge of each of the K pulses in the predetermined period and an amount of electric charges input from an input signal that is input in response to the other edge to voltages in which one polarity is inverted and becomes equal to the other polarity, and which outputs the voltages, and the second switched capacitor circuit is allowed to operate as an IIR filter that performs 2K times of sampling in the predetermined period.

According to this, it is possible to set a configuration capable of allowing the detection circuit to perform the most appropriate operation among the configurations of [2] to [4] or [6] to [9], or other configurations in accordance with the environment in which the touch panel control circuit is mounted and used, and thus it is possible to cope with various noise environments.

[11] Detection Circuit Provided with SCF Synchronously Operating Before Integration Circuit A touch panel control circuit (3) according to representative embodiments disclosed in this application is capable of being connected to a touch panel (1) in which an intersection capacitor (Cxy) is formed at each of a plurality of intersections at which a plurality of Y electrodes (Y1 to YM) and a plurality of X electrodes (X1 to XN) intersect each other.

The touch panel control circuit (3) includes a plurality of drive circuits (30) that drive the plurality of Y electrodes, respectively, a plurality of detection circuits (10) that are connected to the plurality of X electrodes, respectively, and detect a capacitance value of the intersection capacitor, and a sequence control circuit (308).

The drive circuits are capable of applying K (K is an integer of 2 or more) pulses to the Y electrodes in a predetermined period.

In the detection circuit, a first switched capacitor circuit (11) that is connected to each of input terminals (PX1 to PXN) that are capable of being connected to the X electrodes, a first sample-and-hold circuit (S41, Csh1), a second switched capacitor circuit (12), a second sample-and-hold circuit (S43, Csh2), an integration circuit (13), and a third sample-and-hold circuit (14) that retains an output of the detection circuit are sequentially connected.

The first switched capacitor circuit includes a first operational amplifier (AMPit1) in which a positive side input is fixed to a predetermined potential (VHSP), a first integration capacitor (Cs1) that is connected to between a negative side input and an output of the first operational amplifier, a first switch (S1) that is connected to between the negative side input and the output of the first operational amplifier, and a second switch (S2) that is connected to between the input terminal and the negative side input of the first operational amplifier.

The second switched capacitor circuit includes a second operational amplifier (AMPit2) in which a positive side input is fixed to a predetermined potential (VHSP), a second integration capacitor (Cs2a, Cs2b) that is connected to between a negative side input and an output of the second operational amplifier, and has a configuration in which a part or the entirety of a capacitance value is capable of being discharged by control, and a fourth switch (S42) that is connected to between an output of the first sample-and-hold circuit and the negative side input of the second operational amplifier.

The integration circuit includes a third operational amplifier (AMPit3) in which a positive side input is fixed to a predetermined potential (VHSP), a third integration capacitor (Cs3) that is connected to between a negative side input and an output of the third operational amplifier, a third switch (S14) that is connected to between the negative side input and the output of the third operational amplifier, and a fifth switch (S44) that is connected to between an output of the second sample-and-hold circuit and the negative side input of the third operational amplifier.

The sequence control circuit controls a timing of turning on/off the first to fifth switches of the detection circuit and a timing of discharging a part or the entirety of the second integration capacitor in synchronization with a timing of outputting the K pulses with respect to the drive circuit.

According to this, as is the case with [1], it is possible to provide a touch panel control circuit capable of obtaining a further higher noise suppressing effect in comparison to the noise suppressing effect of the integration circuit. When a control sequence of the sequence control circuit is appropriately set, it is possible to allow the first and second switched capacitor circuits to execute a plurality of operations including the operations described in [2] to [4] in a programmable manner.

[12] Dual Edge Type

In [11], the first switched capacitor circuit has a configuration capable of performing control of inverting a connection direction of the first integration capacitor.

The sequence control circuit controls the timing of turning on/off the first to fifth switches of the detection circuit, the timing of discharging a part or the entirety of the second integration capacitor, and a timing of inverting the connection direction of the first integration capacitor in synchronization with a rising edge and a falling edge of the K pulses that are output to the drive circuit.

According to this, as is the case with [10], it is possible to construct a touch panel control circuit, which is capable of improving the touch detection sensitivity similar to [6] to [10], in a programmable manner.

[13]+SH+Selector+ADC

The touch panel control circuit according to [11] or [12] further includes an analog/digital conversion circuit (304), the third sample-and-hold circuit that retains outputs of the plurality of detection circuits, respectively, and a selection circuit (303) that selects one voltage from a plurality of voltages retained in the third sample-and-hold circuit and supplies the selected voltage to the analog/digital conversion circuit.

The sequence circuit controls the plurality of drive circuits (30_1 to 30_M) in order for the K pulses to be sequentially applied to the plurality of Y electrodes (Y1 to YM) in a predetermined period to allow the plurality of detection circuits (10_1 to 10_N) to operate in parallel for every predetermined period, and controls the selection circuit in order for outputs of the plurality of detection circuits to be sequentially supplied to the analog/digital conversion circuit.

According to this, a capacitance variation of each of the intersection capacitors that are two-dimensionally arranged can be sequentially measured by one analog/digital converter, and thus it is possible to supply digital data for performing a process such as touch coordinate detection by digital signal processing.

[14] Touch Panel Controller IC

A semiconductor integrated circuit (3, 101, 102) includes the touch panel control circuit (TPC, 3) according to any one of [1] to [13] on a single semiconductor substrate.

According to this, a touch panel controller IC including the touch panel control circuit having high noise resistance is provided.

[15] Display Driver+Touch Panel Controller IC

The semiconductor integrated circuit (101, 102) according to [14] further includes a display drive circuit (DPC, 4), which is connected to a display panel configured to overlap the touch panel and which is capable of being driven and controlled, on the single semiconductor substrate.

According to this, there is provided an integrated IC that is connected to a display and touch panel in which the display panel and the touch panel are laminated and are integrally configured, and thus mutual cooperation of display drive and touch sensing control becomes easy.

[16] Display Driver+Touch Panel Controller+Microcomputer IC

The semiconductor integrated circuit (102) according to [15] further includes a microcontroller (SMPU, 5), which is capable of controlling the touch panel control circuit and is capable of reading out data based on the output of the detection circuit, on the single semiconductor substrate.

According to this, an IC, in which the microcontroller is further integrated in the same chip, is provided, and thus the mutual cooperation of the display drive and the touch sensing control becomes even easier. Accordingly, it is possible to reduce the burden of an application processor that is attached outside.

2. Further Detailed Description of the Embodiments

The embodiments will be described in more detail.

First Embodiment

Detection Circuit Provided with SCF Synchronously Operating Before Integration Circuit FIG. 1 illustrates an overall configuration of a display and input device 100 to which the invention is applied as an example. The display and input device 100 shown in the same drawing is an example of electronic equipment relating to the invention, and constitutes, for example, a part of a portable terminal such as a personal digital assistant (PDA) and a cellular phone. The display and input device includes a touch panel (TP) 1, a display panel (DP) 2, a touch panel controller (TPC) 3, a display panel controller (DPC) 4, a sub-processor (SMPU) 5, and a host processor (HMPU) 6. The touch panel controller 3, the display panel controller 4, and the sub-processor 5 (as desired) are formed as one semiconductor chip, or are mounted in one package, thereby realizing a single semiconductor device 101, 102. For example, when the touch panel controller 3 and the display panel controller 4 are mounted as one chip IC, the IC is connected to a display and touch panel in which the display panel 2 and the touch panel 1 are stacked and are integrally configured, and thus mutual cooperation of display drive and touch sensing control becomes easy. In addition, when the sub-processor (SMPU) 5 is integrated in the same chip, mutual cooperation of the display drive and the touch sensing control becomes even easier, and thus it is possible to reduce the burden of a host processor (HMPU) 6 that is attached outside.

The touch panel 1 is a mutual-capacitance type touch panel that is capable of realizing multi-touch detection, and includes a plurality of intersections that are constituted by a plurality of drive electrodes (Y electrodes) and a plurality of detection electrodes (X electrodes). A capacitive component (intersection capacitor) is formed at each of the intersections. The touch panel controller 3 supplies a sequential drive pulse to the drive electrodes, and according to this, detection data in accordance with a variation in the capacitive component at the intersections is obtained on the basis of signals that are sequentially obtained from the detection electrodes. The sub-processor (SMPU) 5 that is a microprocessor for a sub-system controls drive of the touch panel 1 and performs a process of detecting a touch state or coordinates from the detection data acquired by the touch panel controller 3. For example, the sub-processor 5 performs a digital filter operation with respect to the detection data, and position coordinates of an intersection at which a variation in capacitance occurs are calculated on the basis of data from which noise is removed by the digital filter operation. For example, to indicate the position of the intersections at which a stray capacitance varies, that is, a finger approaches (touches, or a contact event occurs) which position of the intersections, position coordinates when the contact event occurs are calculated.

The touch panel 1 is constituted by using a transparent (light-transmitting) electrode or a dielectric film, and for example, the touch panel 1 is disposed on a display surface of the display panel 2 to overlap therewith. The touch panel 1 and the display panel 2 may have an in-cell configuration in which the touch panel 1 and the display panel 2 are integrally mounted, or may have a cover-glass-integrated configuration in which a touch panel 1 and a cover glass provided on an upper surface are integrally formed.

The host processor (HMPU) 6 generates display data, and the display panel controller 4 performs display control of displaying the display data received from the host processor 6 on the display panel 2. The host processor 6 acquires position coordinate data when the contact event occurs from the sub-processor 5, and analyzes an input by manipulation of the touch panel 1 from a relationship between the position coordinate data in the display panel 2 and a display screen that is displayed by the display panel controller 4.

Optionally, a communication control unit, an image processing unit, a voice processing unit, and an accelerator in addition to the units, which are not shown in the drawing, are embedded in the host processor 6, or are connected to the host processor 6, thereby constituting, for example, a portable terminal.

Figure 2:
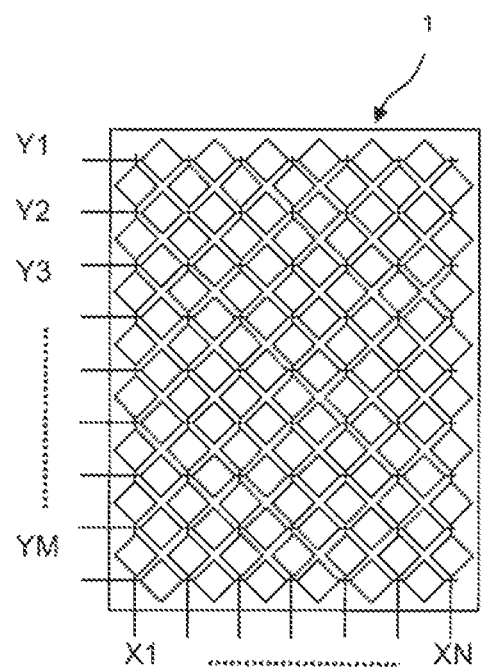
FIG. 2 is a plan view illustrating an electrode configuration of a touch panel.

FIG. 2 illustrates an electrode configuration of the touch panel 1 as an example. The touch panel 1 has a configuration in which the plurality of drive electrodes (Y electrodes) Y1 to YM (also, described as Y electrodes Ym) that are formed in a horizontal direction, and the plurality of detection electrodes (X electrodes) X1 to XN (also, described as X electrodes Xn) that are formed in a vertical direction are electrically insulated from each other. The intersection capacitor is formed at the intersections of the X electrodes and the Y electrodes through a capacitive electrode of each of the electrodes. When an object such as a finger approaches the intersection capacitor, a stray capacitance, which occurs when the object constitutes a capacitive electrode, is added to a capacitance value of the intersection capacitor. For example, a drive pulse from the touch panel controller 3 is applied to the Y electrodes Y1 to YM in the arrangement order thereof to drive these electrodes. FIG. 2 illustrates the touch panel 1 in which an electrode shape is a rhombic shape, but the electrode shape may be other shapes such as a lattice shape.

Figure 6:
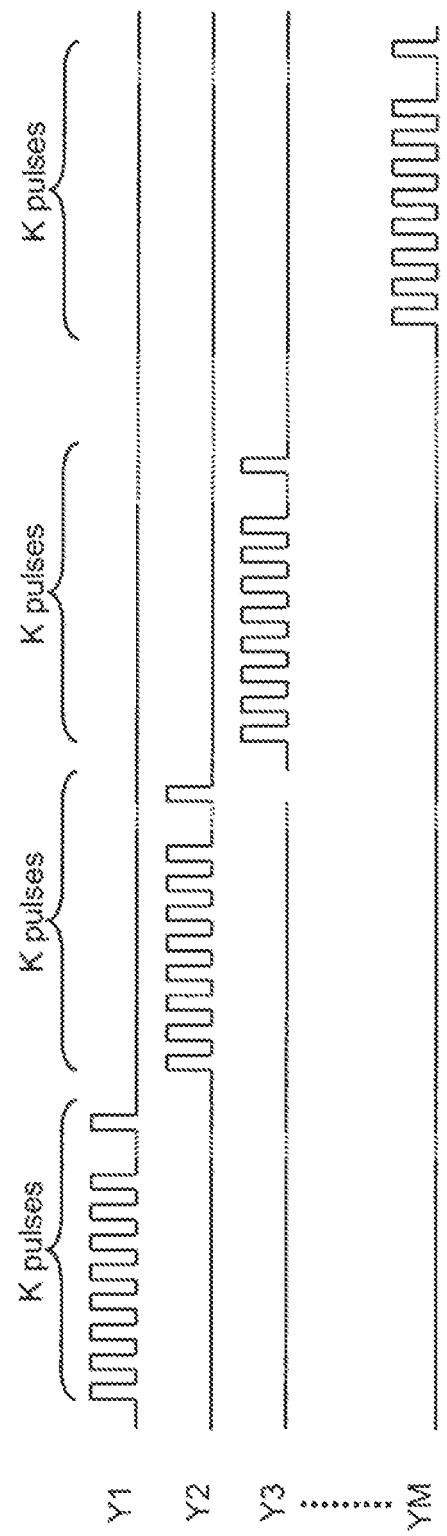
FIG. 6 is a waveform diagram illustrating an example of a signal waveform of a drive pulse signal that is supplied to Y electrodes Y1 to YM.

FIG. 6 illustrates an example of a signal waveform of a drive pulse signal that is supplied to the Y electrodes Y1 to YM. For example, a drive pulse having a predetermined number of pulses is supplied to the Y electrodes Y1 to YM in an electrode arrangement order. Here, an example, in which drive pulses having K pulses per one Y electrode are supplied in the order of the Y electrodes Y1 to YM not to overlap each other, is illustrated conveniently in the drawing. The number of pulses is arbitrary. The number of pulses may not be periodic and may be intermittent.

Figure 3:
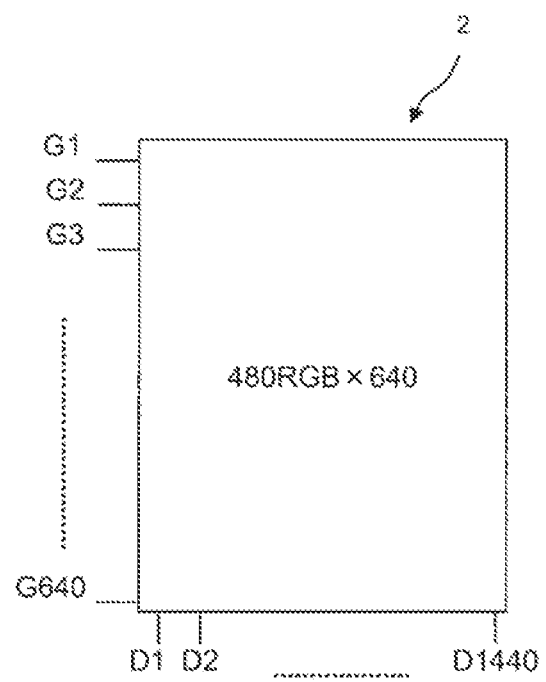
FIG. 3 is a plan view illustrating an electrode configuration of a display panel.

FIG. 3 illustrates an electrode configuration of the display panel 2. A display size of the display panel 2 which is shown in the same drawing is, for example, a size of 480 RGB×640 that is VGA. In the display panel 2, gate electrodes G1 to G640 as scanning electrodes that are formed in a horizontal direction and drain electrodes D1 to D1440 as signal electrodes that are formed in a vertical direction are disposed, a selection terminal is connected to a corresponding scanning electrode at intersections of the gate electrodes and the drain electrodes, and a plurality of display cells in which an input terminal is connected to a corresponding signal electrode are disposed. For example, a scanning pulse is supplied to the gate electrodes G1 to G640 from the display panel controller 4 in the arrangement order of the gate electrodes to drive (scanning-drive) the gate electrodes G1 to G640. Grayscale data of a scanning drive line is supplied to the drain electrodes D1 to D1440 in synchronization with the scanning drive of the gate electrode. A display size of the display panel 2 is arbitrary and not limited to the illustrated display size.

Figure 4:
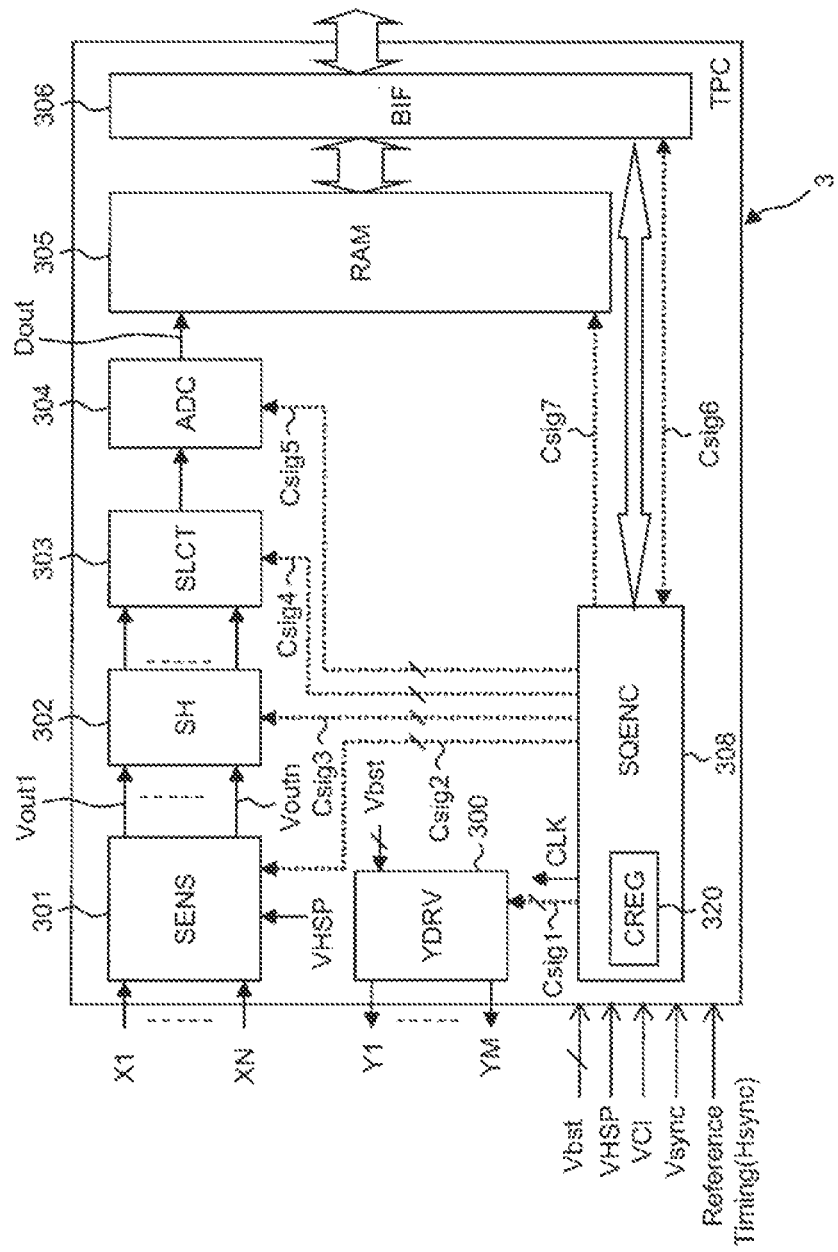
FIG. 4 is a block diagram illustrating an overall configuration of a touch panel controller.

FIG. 4 illustrates an overall configuration of the touch panel controller 3. The touch panel controller 3 includes a drive circuit (YDRV) 300, a detection circuit (SENS) 301, a sample-and-hold circuit (SH) 302, a selector (SLCT) 303, an analog/digital conversion circuit (ADC; hereinafter, also referred to as an AD conversion circuit) 304, a random access memory (RAM) 305, a bus interface circuit (BIF) 306, and a sequence control circuit (SQENC) 308 as a control circuit. It is suitable that the sequence control circuit (SQENC) 308 includes a control register (CREG) 320 which can set a control sequence in a programmable manner. The control resistor (CREG) may be constituted by a nonvolatile storage element, or may be constituted by a volatile storage element and have a configuration in which initialization or appropriate modification thereof can be performed by the sub-processor (SMPU) 5.

The drive circuit 300 repeats an operation of sequentially outputting a drive pulse to the Y electrodes Y1 to YM to detect touching, for example, at a predetermined timing as illustrated in FIG. 6. The drive pulse that is supplied for each Y electrodes is controlled to have a constant number of plural pulses (for example, K pulses). A signal, which is synchronized with the drive pulse through an intersection capacitor, is shown in the X electrodes X1 to XN. When a finger of a user or the like comes into contact with or approaches the intersection capacitor, an electric charge that is charged in the intersection capacitor is removed from the drive pulse. A signal, which is generated in association with migration of an electric charge generated in the X electrodes X1 to XN in synchronization with the drive pulse is input to the detection circuit 301. The detection circuit 301 includes a switched capacitor circuit that can operate with respect to an input signal from the X electrodes in synchronization with the drive pulse, and an integration circuit that is connected to an output of the switched capacitor circuit and operates in synchronization with the drive pulse. A signal that is integrated is retained in the sample-and-hold circuit 302 for each detection electrode, the detection signal that is retained is selected by the selector 303, and the detection signal that is selected is converted into digital detection data by the AD conversion circuit 304. The detection data that is converted is stored in the RAM 305. The detection data that is stored in the RAM 305 is supplied to the sub-processor 5 through the bus interface circuit 306, and is used in the calculation of touch coordinates.

The sequence control circuit 308 controls operations of the drive circuit 300, the detection circuit 301, the sample-and-hold circuit 302, the selector 303, the AD conversion circuit 304, and the bus interface circuit 306 by using control signals Csig1 to Csig6, and performs access control of the RAM 305 with a control signal Csig7. In addition, optionally, a pulse voltage Vbst of a drive pulse that is output to the Y electrodes by the drive circuit 300, an initialization voltage (pre-charge voltage) VHSP of the X electrodes which is input by the detection circuit 301, and power supply voltages VCI are supplied from the outside of the touch panel controller 3.

Figure 5:
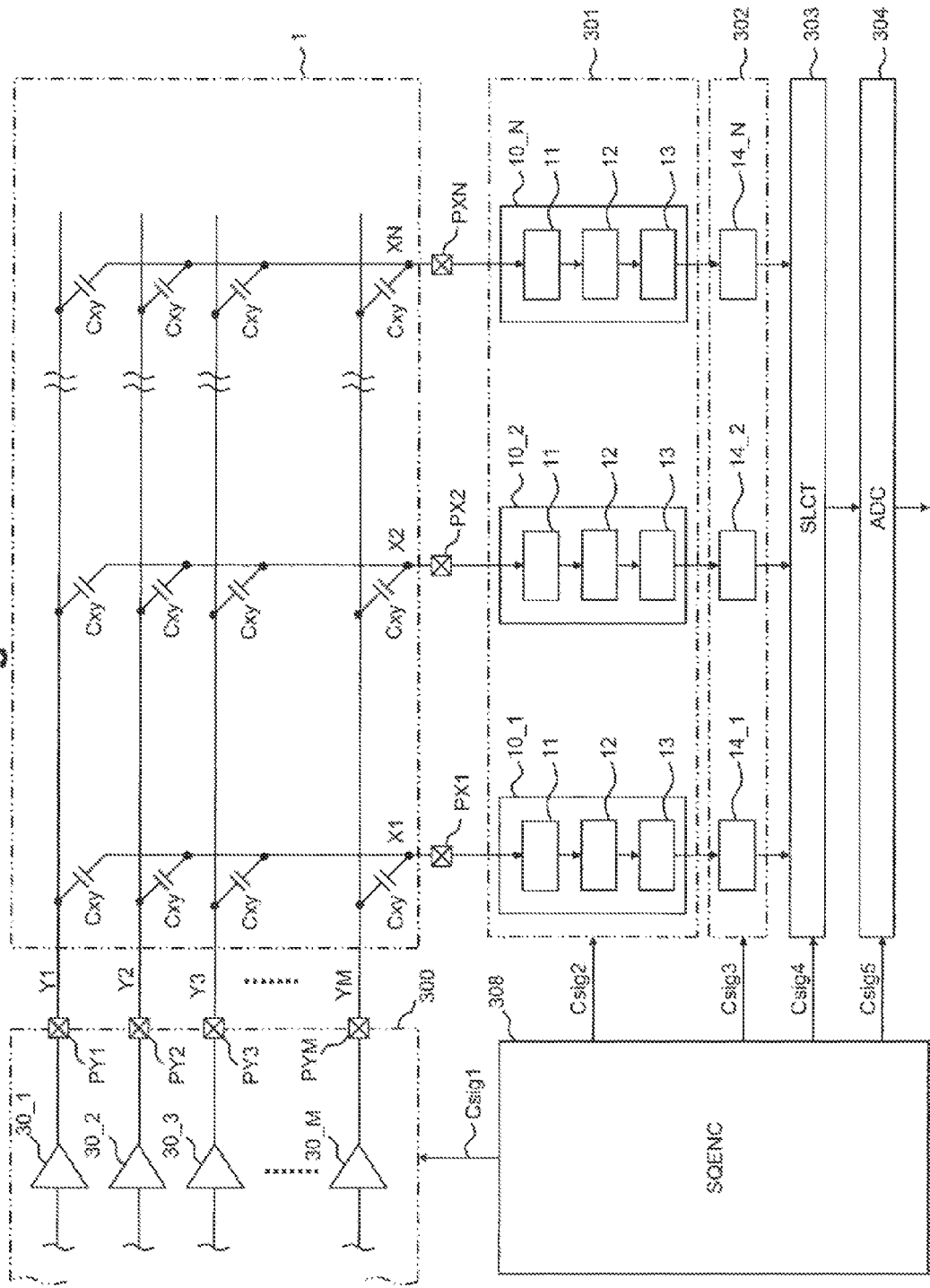
FIG. 5 is a circuit diagram illustrating an example of an equivalent circuit and an integration circuit of the touch panel.

FIG. 5 illustrates an example of an equivalent circuit and the detection circuit 301 of the touch panel 1. In the touch panel 1, the Y electrodes Y1 to YM and the X electrodes X1 to XN are arranged in a matrix shape, and an intersection capacitor (mutual capacitor) Cxy is formed at each of intersections of the X electrodes and the Y electrodes. The drive circuit 300 includes drive amplifiers 301 to 30M that supply, for example, a drive pulse illustrated in FIG. 6 on the basis of the control signal Csig1 input to each of the Y electrodes Y1 to YM.

The detection circuit 301 includes detection circuits 10_1 to 10_N that correspond to the X electrodes X1 to XN, respectively. When a pulse is applied to the Y electrodes, electric charges corresponding to the intersection capacitors Cxy are input in parallel with each other to the detection circuits 10_1 to 10_N from the X electrodes X1 to XN. Each of the detection circuits 10_1 to 10_N includes first and second switched capacitor circuits 11 and 12, and an integration circuit 13. Outputs of the detection circuits 10_1 to 10_N are transmitted to the sample-and-hold circuits 14_1 to 14_N, respectively, and are retained as a voltage value. The selector selects each of the voltage values that are retained in the sample-and-hold circuits 14_1 to 14_N on the basis of the control signal Csig4 and inputs the voltage value that is selected to the AD conversion circuit 304.

The operation of the first and second switched capacitor circuits 11 and 12, the integration circuit 13, and the sample-and-hold circuit 14 is controlled in synchronization with a drive pulse that is applied to the Y electrodes Y1 to YM by the control signals Csig2 and Csig3. For example, an operation as a switched capacitor filter (SCF), in which a repeating period of the drive pulse is set as a sampling period, is allowed. This switched capacitor filter performs a filter operation with respect to signal charges, which are transmitted from the intersection capacitor to be detected a plurality of times in synchronization with the plurality of pulses, in synchronization with the signal charges, and thus it is possible to suppress noise of signals from being supplied to the integration circuit that operates in synchronization with the filter operation.

For operation as a discrete system, the integration circuit has periodic frequency characteristics for each sampling frequency, and the switched capacitor filter also operates in synchronization with the same sampling frequency, integral times of the sampling frequency, or 1/integer of the sampling frequency, and thus the switched capacitor filter also has periodic frequency characteristics. The integration circuit has frequency characteristics which have a maximum gain at a direct current (frequency=0) and the sampling frequency, and in which the gain decreases in a bath tub shape at a frequency therebetween. It is also possible to allow the switched capacitor filter to operate in synchronization with the integration circuit, accordingly, it is easy to design the switched capacitor filter to have a maximum gain at the direct current (frequency=0) and the sampling frequency, and the gain can be further suppressed at a frequency therebetween.

In contrast, the signal charges are transmitted from the intersection capacitor a plurality of times in synchronization with the plurality of pulses, and thus the signal charges are input as a signal having an effective signal component in the sampling frequency itself. On the other hand, noise has no relation with this phenomenon, and is an asynchronous signal, and thus the noise is distributed at wide frequencies in addition to the sampling frequency. If frequency characteristics of the switched capacitor filter and the integration circuit are set to characteristics which have a maximum gain at a direct current (frequency=0) and a sampling frequency and in which the gain is suppressed at a frequency therebetween, it is possible to further effectively suppress noise while suppressing deterioration of signals.

In this embodiment, an example, in which two-stage switched capacitor circuits 11 and 12 are provided at a previous stage of the integration circuit 13, is illustrated, but the number of stages of the switched capacitor circuit may be changed in an arbitrary manner.

Second Embodiment

Programmable SCF (Single Edge Detection Type

A more detailed configuration example of the detection circuit 10 according to an embodiment of the invention will be described.

Figure 7:
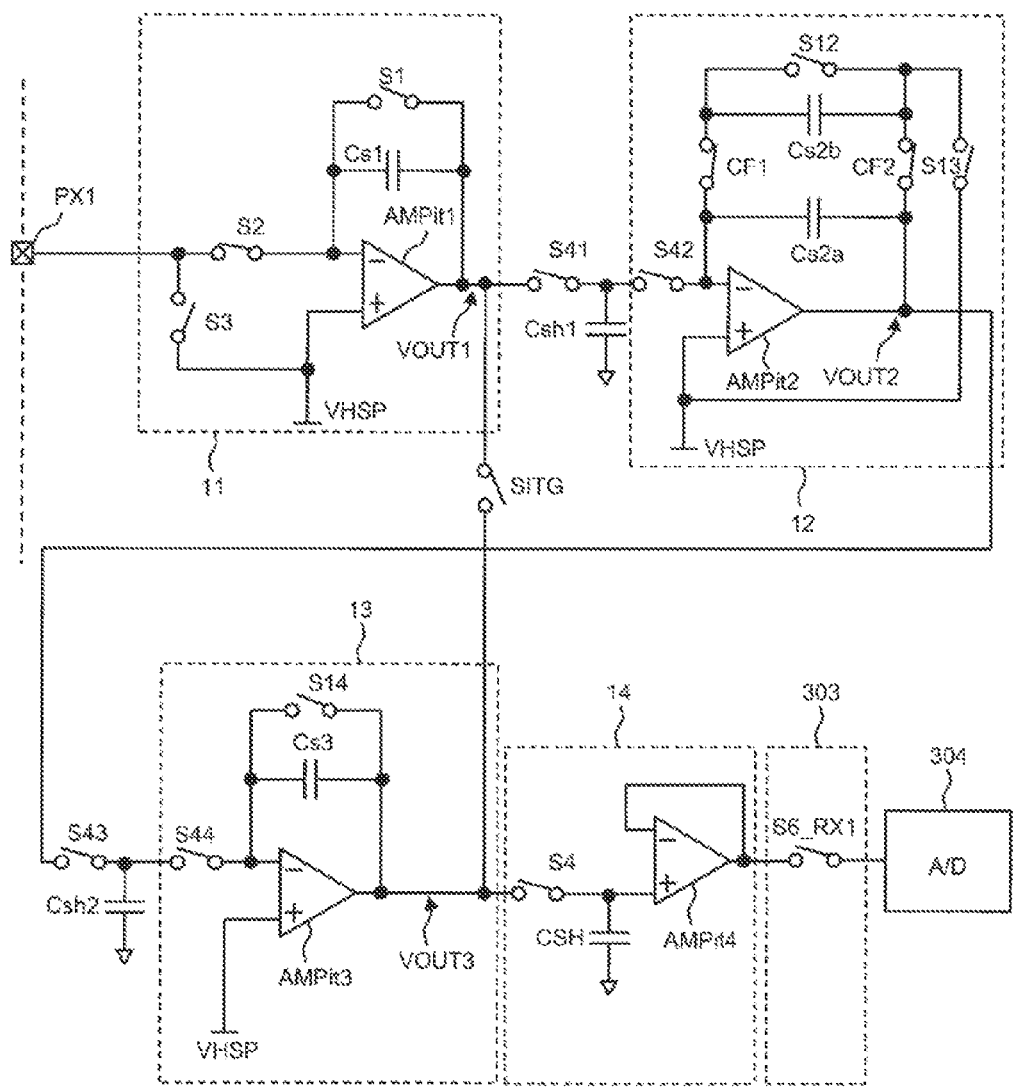
FIG. 7 is a circuit diagram illustrating a configuration example of a detection circuit (single edge detection type) according to a second embodiment.

FIG. 7 is a circuit diagram illustrating a configuration example of a detection circuit (single edge detection type) according to a second embodiment. FIG. 7 illustrates an example of a circuit configuration in which the detection circuit 301, the sample-and-hold circuit 302, and the selector 303 are connected to one detection electrode (X electrode). For example, these components are connected to the detection electrode (X electrode) X1 through a terminal PX1. The detection circuit 10_1 that is connected to one detection electrode (X1) includes first and second switched capacitor circuits 11 and 12, and an integration circuit 13. An output of the first switched capacitor circuit 11 is transmitted to the second switched capacitor circuit 12 through a switch S41 and a sample-and-hold capacitor Csh1, and an output of the second switched capacitor circuit 12 is transmitted to the integration circuit 13 through a switch S43 and a sample-and-hold capacitor Csh2. An output of the integration circuit 13 is connected to one sample-and-hold circuit 14, which constitutes the sample-and-hold circuit 302, through the switch S4. An output of the sample-and-hold circuit 14 is connected to the AD conversion circuit 304 through one switch S6_RX1 that constitutes the selector 303. An output of the first switched capacitor circuit 11 may be connected to a switch S4, which is an input of the sample-and-hold circuit 14, through a switch SITG. The output of the first switched capacitor circuit 11 may be transmitted to the sample-and-hold circuit 14 by stopping operation of the second switched capacitor circuit 12 and the integration circuit 13 and by by-passing these circuits. The integration circuit 13 has a configuration in which when an operation thereof is stopped, an output VOUT3 becomes a high impedance. The above-described respective switches, and respective switches, which are described later, in the first and second switched capacitor circuits 11 and 12 and the integration circuit 13 are controlled by the control signals Csig2 to Csig4 that are output from the sequence control circuit 308.

The first switched capacitor circuit 11 includes an operational amplifier AMPit1 in which a positive side input (+) is fixed to a predetermined potential (VHSP). An integration capacitor Cs1 and a switch S1 are connected in parallel with each other between a negative side input (−) and an output VOUT1 of the operational amplifier AMPit1. A switch S2 is connected to between the input terminal PX1 and the negative side input (−) of the operational amplifier AMPit1. The input terminal PX1 may be fixed to the predetermined potential VHSP by a switch S3. For example, the input terminal PX1 can be fixed to the predetermined potential VHSP with the switch S3 in order for a potential of the X electrodes not to vary even when application of a pulse that operates the Y electrodes and a timing of the switch S2 deviate from each other. As described later, the first switched capacitor circuit 11 can be allowed to operate as an FIR filter, a QV converter, or an integration circuit by appropriately controlling a timing of the switches S1 to S3, and the switch S41 that controls transmission to the sample-and-hold capacitor Csh1 of a subsequent stage.

The second switched capacitor circuit 12 includes an operational amplifier AMPit2 having a configuration in which a positive side input (+) is fixed to a predetermined potential VHSP. Integration capacitors Cs2a and Cs2b and a switch S12 are connected in parallel with each other between a negative side input (−) and an output VOUT2 of the operational amplifier AMPit2. The integration capacitors Cs2a and Cs2b are connected in parallel to each other or are separated from each other by switches CF1 and CF2. One or both of the integration capacitors Cs2a and Cs2b are configured to be short-circuited and discharged by the switch S12 and to be initialized to the predetermined potential VHSP by a switch S13. That is, the integration capacitors Cs2a and Cs2b are configured in such a manner that a part (only Cs2b) or the entirety (Cs2a+Cs2b) of a capacitance value can be discharged by control of the switches CF1, CF2, and S12. A switch S42 is connected to between the sample-and-hold capacitor Csh1 and the negative side input (−) of the operational amplifier AMPit2. As described later, the second switched capacitor circuit 12 can be allowed to operate as an IIR filter by appropriately controlling the switch S42 that controls an input from the sample-and-hold capacitor Csh1, the switches S12, S13, CF1, and CF2, and the switch S43 that controls transmission to a sample-and-hold capacitor Csh2 of a subsequent stage. It is suitable that the capacitance values of the integration capacitors Cs2a and Cs2b are configured to be changed, for example, by register setting. This is because frequency characteristics of the IIR filter are defined by the capacitance values of the integration capacitors Cs2a and Cs2b.

The integration circuit 13 includes an operational amplifier AMPit3 in which a positive side input (+) is fixed to a predetermined potential VHSP. An integration capacitor Cs3 and a switch S14 are connected in parallel with each other between a negative side input (−) and an output VOUT3 of the operational amplifier AMPit3. A switch S44 is connected to between the sample-and-hold capacitor Csh2 and a negative side input (−) of the operational amplifier AMPit3. It is suitable that a capacitance value of the integration capacitor Cs3 is configured to be changed, for example, by resistor setting. This is because in the integration circuit 13, an amplification effect can be obtained by a ratio between the sample-and-hold capacitor Csh2 and the integration capacitor Cs3, and thus an amplification rate can be adjusted by setting the capacitance value of the integration capacitor Cs3 to be variable. In addition, it is suitable that the number of times of operation of the integration circuit 13, that is, the number of times of piling-up is configured to be changed, for example, by resistor setting. This is because the amplification rate can also be adjusted by the number of times of operation of the integration circuit 13.

The sample-and-hold circuit 14 is constituted by an input switch S4, a sample-and-hold capacitor CSH, and a voltage follower amplifier using an operation amplifier AMPit4.

The detection circuit 301 can be allowed to selectively operate in at least three operation modes to be described below by appropriately controlling the above-described respective switches. It is suitable that selection of the operation modes is configured to appropriately set a control sequence of the above-described respective switches by providing the control register (CREG) 320 to the sequence control circuit (SQENC) 308. The control register (CREG) 320 may be configured as a nonvolatile memory element, or may be configured as a volatile memory element to be initialized or appropriately changed by the sub-processor (SMPU) 5 and the like.

In a first operation mode, the first switched capacitor circuit 11 is allowed to operate as an FIR filter, the second switched capacitor circuit 12 is allowed to operate as an IIR filter, and results of the operations are output after being integrated (accumulatively added) in the integration circuit 13. In a second operation mode, the first switched capacitor circuit 11 is allowed to operate as a QV conversion circuit, the second switched capacitor circuit 12 is allowed to operate as the IIR filter, and results of the operations are output after being integrated (accumulatively added) in the integration circuit 13. In a third operation mode, the first switched capacitor circuit 11 is allowed to operate as an integration circuit, and operations of the second switched capacitor circuit 12 and the integration circuit 13 are stopped, and thus the output VOUT1 of the first switched capacitor circuit 11 is output as an output of the detection circuit 301.

According to this, it is possible to set a configuration capable of allowing the detection circuit 301 to perform the most appropriate operation among the above-described configurations thereof or other configurations in accordance with an environment in which the touch panel control circuit 3 is mounted and used, and thus it is possible to cope with various noise environments. Here, the above-described other configurations represent, for example, a case where the second switched capacitor circuit 12 is allowed to operate as the FIR filter other than the IIR filter, and the like. When the switches CF1 and CF2 are closed, at all times, the integration capacitors Cs2a and Cs2b are connected in parallel with each other, and thus the second switched capacitor circuit 12 can be allowed to operate as the FIR filter.

The respective operation modes will be described in more detail.

First Operation Mode (FIR+IIR+Integration Circuit)

In the first operation mode, the first switched capacitor circuit 11 is allowed to operate as the FIR filter, the second switched capacitor circuit 12 is allowed to operate as the IIR filter, and results of the operations are output after being integrated (accumulatively added) in the integration circuit 13.

FIG. 8 is a timing chart illustrating an operation example of the above-described first operation mode (FIR+IIR+integration circuit). Time is shown in the horizontal axis with an arbitrary unit (a.u.), and signals (TX1 and TX2) for application of pulses to the Y electrodes and signals for on/off control of the above-described respective switches are shown in the vertical axis direction from an upper side. As described above with reference to FIG. 6, a plurality of pulses are sequentially applied to the Y electrodes. FIG. 8 illustrates parts of the plurality of pulses. 16 pulses are applied to the electrode Y1 from time t=0.5, and six pulses among the 16 pulses, which are applied to the electrode Y2 from time t=16.5, are shown. When a pulse is applied to the Y electrode, an electric charge corresponding to the intersection capacitor Cxy is input from the X electrode to the input terminal PX1 of the detection circuit 10_1.

The switch S2 of the first switched capacitor circuit 11 is closed in synchronization with the pulse that is applied to the Y electrode, and the electric charge that is input is transmitted to the integration capacitor Cs1. Whenever the electric charge is transmitted, the electric charge is accumulated in the integration capacitor Cs1, and is output to the VOUT1. The switch S1 discharges the electric charges accumulated in the integration capacitor Cs1 in a periodic manner similar to time t=0 to 0.5, and t=5 to 5.5. The output VOUT1 is retained in the sample-and-hold capacitor Csh1 through the switch S41. As described above, the first switched capacitor circuit 11 operates as a quartic FIR filter, integrates the electric charges which are periodically input to the terminal PX1 in synchronization with the pulse applied to the Y electrode and which correspond to four pulse periods, and outputs the integrated electric charges to the sample-and-hold capacitor Csh1 for every four pulse periods.

The output of the first switched capacitor circuit 11, which is retained in the sample-and-hold capacitor Csh1, is input to the second switched capacitor circuit 12 by the switch S42 for every four pulse periods. At time t=4 to 4.5, all of the switches CF1 and CF2 are closed, and the integration capacitors Cs2a and Cs2b are connected in parallel with each other, and thus the capacitance value becomes a value of Cs2a+Cs2b. The output of the FIR filter, which is input, is accumulated in the integration capacitors Cs2a+Cs2b. At time t=4.5 to 8, the switches CF1 and CF2 are opened in combination with each other, and the switches S12 and S13 are closed. Accordingly, the integration capacitor Cs2b is short-circuited and is discharged, and is initialized with a voltage VHSP. Next, at time t=8 to 8.5, all of the switches CF1 and CF2 are closed again, and the subsequent output of the FIR filter, which is input, is accumulated in the integration capacitors Cs2a and Cs2b. As described above, the second switched capacitor circuit 12 operates as the IIR filter in which among electric charges that are retained up to an immediately previous sampling, Cs2b/(Cs2a+Cs2b) is discarded, and newly input sampling data is accumulated in the integration capacitors Cs2a+Cs2b. It is possible to adjust frequency characteristics by a ratio Cs2b/(Cs2a+Cs2b) which determines a feedback coefficient of the IIR filter. When the capacitance values of the integration capacitors Cs2a and Cs2b are configured to be changed, for example, by register setting, adjustment of the frequency characteristics is possible.

An output of the second switched capacitor circuit 12 that operates as the IIR filter is transmitted to the sample-and-hold capacitor Csh2 by closing the switch S43, and is input to the integration circuit 13 by closing the switch S44. In the integration circuit 13, outputs of the IIR filter, which are input four times at time t=4.5, t=8.5, t=12.5, and t=16.5, are output after being accumulatively added in the integration capacitor Cs3. The output VOUT3 of the integration circuit 13 is transmitted to the sample-and-hold capacitor CSH of the sample-and-hold circuit 14 by closing the switch S4 (time t=17). On the other hand, electric charges accumulated in the integration capacitor Cs3 of the integration circuit 13 are discharged by closing the switch S14 (time t=18), and thus the integration circuit 13 is reset.

When being selected by the switch S6_RX1 of the selector 303 (time t=57), an output retained in the sample-and-hold capacitor CSH is input to the AD conversion circuit 304 through the voltage follower amplifier using the operational amplifier AMPit4.

Subsequently, although not shown, the detection circuit repeats the above-described operations with respect to pulses (TX2 to TXM) that are applied to electrodes Y2 to YM by other operational amplifiers 30_2 to 30_M.

Hereinbefore, description has been given of an example in which when 16 pulses are applied to the terminal PX1, the first switched capacitor circuit 11 is allowed to operate as a quartic FIR filter that operates for every four pulses, and the second switched capacitor circuit 12 is allowed to operate as a quartic IIR filter that operates for every four pulses, but the order of the FIR filter and the IIR filter can be changed in an arbitrary manner. In addition, it is suitable that the number of times of operation of the integration circuit 13, that is, the number of times of piling-up is configured to be changed, for example, by resistor setting.

A signal charge transmission timing, which is shown in FIG. 8, between the first switched capacitor circuit 11 that operates as an FIR filter, the second switched capacitor circuit that operates as an IIR filter, and the integration circuit is illustrative only, and can be changed in an arbitrary manner. For example, description has been given to an example in which the input to the second switched capacitor circuit 12 and the output therefrom are performed at the same timing, but a timing can be adjusted to increase time interval from the input to the IIR filter to the output from the IIR filter by retarding a timing of closing the switch S43 in comparison to a timing of closing the switch S42 by several cycles, and the like. In addition, the second switched capacitor circuit 12 is also allowed to operate as an FIR filter by closing the switches CF1 and CF2 at all times.

As described above, the first switched capacitor circuit 11 is capable of operating as an FIR filter of L-order (L is an integer of 1 or more which is smaller than K) which performs K times of sampling in a predetermined period, and the second switched capacitor circuit 12 is capable of operating as a switched capacitor filter (for example, an IIR filter and an FIR filter) that performs K/L times of sampling in the predetermined period.

Figure 9A:
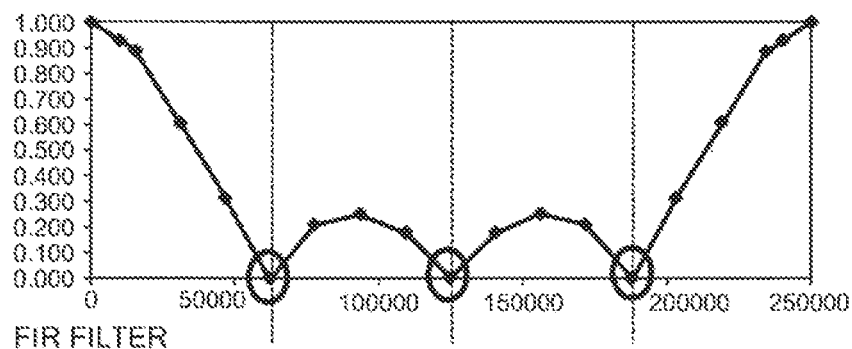
FIGS. 9A to 9C are graphs illustrating frequency characteristics of a first operation example (FIR+IIR+integration circuit)
Figure 9B:
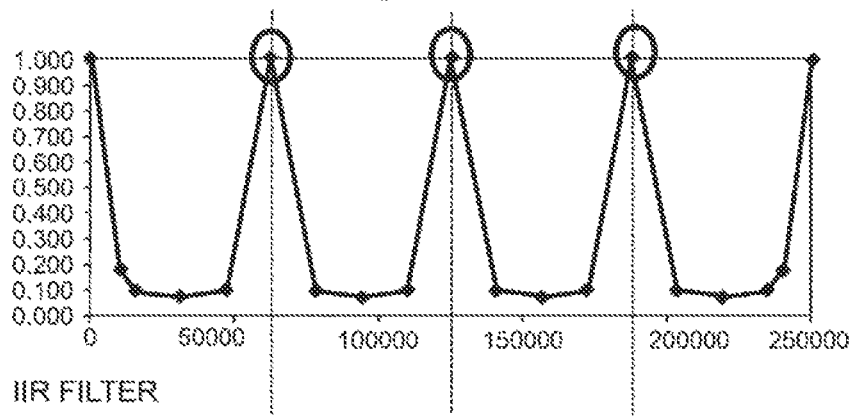
Figure 9C:
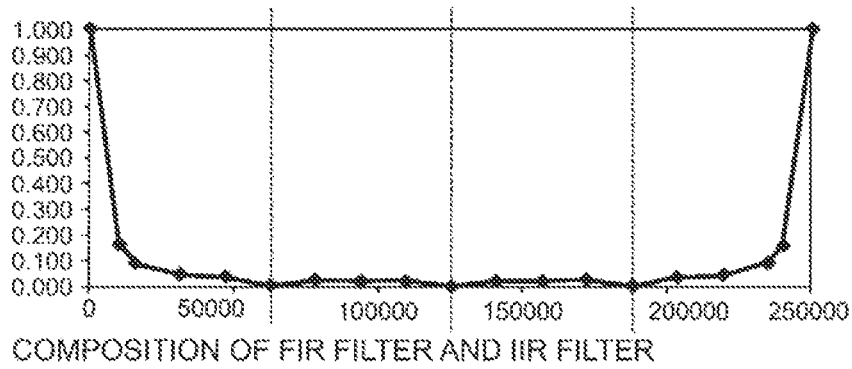

FIGS. 9A to 9C are graphs illustrating frequency characteristics of the above-described first operation mode (FIR+IIR+integration circuit). FIG. 9A illustrates frequency characteristics of a quartic FIR filter, FIG. 9B illustrates frequency characteristics of a quartic IIR filter, and FIG. 9C illustrates frequency characteristics obtained by composing these frequency characteristics. In the drawings, a frequency f is shown on the horizontal axis with an arbitrary unit (a.u.) and a gain (attenuation rate) is shown on the vertical axis. A maximum value f=25000, which is shown, is a sampling frequency fs, and is a reciprocal of a period at which the switch S2 is closed. FIG. 9A illustrates frequency characteristics of a quartic FIR filter that is realized by the first switched capacitor circuit 11. In the frequency characteristics, a gain becomes 1 at f=0 and f=fs, and the gain becomes 0 at three points including f=fs/4, f=fs/2, and f=3 fs/4. FIG. 9B illustrates frequency characteristics of a quartic IIR filter that is realized by the second switched capacitor circuit 12. In the frequency characteristics, the gain becomes 1 at f=0 and f=fs, and the gain also becomes 1 at three points including f=fs/4, f=fs/2, and f=3 fs/4. Input of the IIR filter is performed once for every four pulses, and thus the quartic IIR filter is an IIR filter in which a sampling frequency is fs/4 and is a discrete system. Accordingly, the quartic IIR filter has frequency characteristics in which repetition occurs for every $fs/4$. FIG. 9C illustrates frequency characteristics obtained by composing these frequency characteristics. The gain=1 of the IIR filter is suppressed at three points including $f=fs/4$, $f=fs/2$, and $f=3\ fs/4$ by the product with the gain=0 of the FIR filter, and thus frequency characteristics, in which a gain is low (attenuation rate is high) as a whole at frequencies other than the sampling frequency, are composed. In the touch panel control circuit 3, a touch detection signal has a frequency of a pulse that is applied to the Y electrodes, and thus the above-described frequency characteristics, in which the gain becomes 1 at a sampling frequency that is the same as the frequency and the attenuation rate is high at frequencies other than the sampling frequency, can effectively suppress noise other than touch detection signals.

Description has been given to an example in which the second switched capacitor circuit 12 operates as the IIR filter. However, in a case of a switched capacitor filter in which the sampling frequency is 1/the order of an FIR filter of a previous stage, it is possible to suppress noise with the same principle. That is, a frequency at which the gain of the FIR filter becomes zero, and a sampling frequency at which a switched capacitor filter of a subsequent stage operates can be made to be equal to each other, and thus it is possible to suppress a pass frequency band of the switched capacitor filter of the subsequent stage using the characteristics of the FIR filter.

Second Operation Mode (QV Conversion+IIR+Integration Circuit)

In the second operation mode, the first switched capacitor circuit 11 is allowed to operate as a QV conversion circuit, the second switched capacitor circuit 12 is allowed to operate as an IIR filter, and results thereof are output after being integrated (accumulatively added) in the integration circuit 13.

FIG. 10 is a timing chart illustrating an operation example of the above-described second operation mode (QV conversion+IIR+integration circuit). As is the case with FIG. 8, time is shown on the horizontal axis with an arbitrary unit, and signals (TX1 and TX2) for application of pulses to the Y electrodes and signals for on/off control of the above-described respective switches are shown in the vertical axis direction from an upper side. Although not particularly limited, a plurality of pulses, in which a low period is longer than that in the description with reference to FIG. 6, are sequentially applied to the Y electrodes. FIG. 10 illustrates parts of the plurality of pulses. At time $t=0.5$, $t=6.5$, $t=12.5$, ... $t=54.5$, nine pulses are applied to the electrode Y1, and one pulse among nine pulses, which are applied to the electrode Y2 from time $t=60.5$, is shown. When a pulse is applied to the Y electrode, an electric charge corresponding to the intersection capacitor Cxy is input from the X electrode to the input terminal PX1 of the detection circuit 10_1.

The switch S2 of the first switched capacitor circuit 11 is closed in synchronization with the pulse that is applied to the Y electrode, and the electric charge that is input is transmitted to the integration capacitor Cs1. Whenever the electric charge is transmitted, the electric charge is accumulated in the integration capacitor Cs1, and is output to the VOUT1. The switch S1 discharges the electric charges accumulated in the integration capacitor Cs1 in a periodic manner similar to time $t=0$ to 0.5, $t=1$ to 6.5, and $t=7$ to 12.5. The output VOUT1 is retained in the sample-and-hold capacitor Csh1 through the switch S41. Differently from the operation as the FIR filter which is described with reference to FIG. 8, a signal charge corresponding to one pulse that is input to the Y electrode is output to VOUT1 as is without being accumulated, and is transmitted to the sample-and-hold capacitor Csh1 and is retained therein. The first switched capacitor circuit 11 operates as a QV conversion circuit that converts an electric charge Q, which is input, to a voltage V. The first switched capacitor circuit 11 periodically converts an electric charge input to the terminal PX1 to a voltage VOUT in synchronization with a pulse that is applied to the Y electrode, and outputs the converted voltage to the sample-and-hold capacitor Csh1 for every one pulse.

An output of the first switched capacitor circuit 11, which is retained in the sample-and-hold capacitor Csh1, is input to the second switched capacitor circuit 12 by the switch S42 for every one pulse period, that is, at time $t=7$, $t=13$, ... $t=55$. A signal charge that is input to the second switched capacitor circuit 12 is accumulated in the integration capacitors Cs2a and Cs2b which are connected in parallel with each other because the switches CF1 and CF2 are closed, and Cs2b/(Cs2a+Cs2b) is discarded at time $t=7$ to 12.5, $t=13$ to 18.5, ... $t=49$ to 54.5. As described above, operation periods are different from each other, but the second switched capacitor circuit 12 operates as the IIR filter.

An output of the second switched capacitor circuit 12 that operates as the IIR filter is transmitted to the sample-and-hold capacitor Csh2 by closing the switch S43, and is input to the integration circuit 13 by closing the switch 344. In the integration circuit 13, outputs of the IIR filter, which are input nine times at time $t=7.5$, $t=13.5$, ... $t=55.5$, are accumulated in the integration capacitor Cs3 and are output. The output VOUT3 of the integration circuit 13 is transmitted to the sample-and-hold capacitor CSH of the sample-and-hold circuit 14 by closing the switch S4 (time $t=56$). On the other hand, electric charges accumulated in the integration capacitor Cs3 of the integration circuit 3 are discharged by closing the switch S14 (time $t=57$), and thus the integration circuit 13 is reset.

When being selected by the switch S6_RX1 of the selector 303 (time $t=57$), an output retained in the sample-and-hold capacitor CSH is input to the AD conversion circuit 304 through the voltage follower amplifier using the operational amplifier AMPit4.

Subsequently, although not shown, the detection circuit repeats the above-described operations with respect to pulses (TX2 to TXM) that are applied to electrodes Y2 to YM by other operational amplifiers 30_2 to 30_M.

Hereinbefore, description has been given to an example in which when nine pulses are input to the terminal PX1, the first switched capacitor circuit 11 is allowed to operate as a QV conversion circuit that operates for every one pulse, and the second switched capacitor circuit 12 is allowed to operate as an IIR filter that operates for every one pulse. However, the order of the IIR filter can be changed in an arbitrary manner.

A sampling frequency of the QV conversion circuit and the IIR filter are made to be equal to a frequency of a pulse that is applied to the Y electrode. Frequency characteristics of the QV conversion circuit and the IIR filter exhibit so-called bath tub-shaped characteristics in which a gain becomes 1 at $f=0$ and $f=fs$, and the gain decreases (attenuation rate increases) at a frequency therebetween. The QV conversion circuit is a primary FIR filter, and does not have a point at which the gain becomes zero. On the other hand, the sampling frequency of the IIR filter is $fs/4$ in the above-described first operation mode, but in this second operation mode, the sampling frequency of the IIR filter is fs similar to the QV conversion circuit. Accordingly, frequency characteristics of the IIR filter become a bath tub-shaped curve without periodicity (repetition) in which the gain becomes 1 between f=0 and f=fs. As a result, as is the case with FIG. 9C, in frequency characteristics that are composed, the gain is low (attenuation rate is high) at frequencies other than the sampling frequency.

According to this, it is possible to effectively suppress noise other than a touch detection signal. In the above-described first operation mode, a frequency at which a gain of the FIR filter of a previous stage becomes zero and a sampling frequency at which a switched capacitor filter of a subsequent stage operates are made to be equal to each other, and thus it is possible to effectively suppress noise other than a touch detection signal. However, in a case where a deviation occurs between a frequency at which a gain of an FIR filter of a previous stage becomes zero and a frequency at which a gain of a switched capacitor filter of a subsequent stage becomes 1 due to an effect of a manufacturing deviation and the like (in principle, it is considered that this problem does not occur), there is a concern that noise is not effectively suppressed. In contrast, in the second operation mode (QV conversion+IIR+integration circuit), a complementary relationship as described above is not used, and thus an effect of a manufacturing deviation and the like is small. In addition, the sampling frequency of the IIR filter can be set to be as high as several times (in the above-described example, four times) the sampling frequency in the first operation mode, and thus it is possible to appropriately design the frequency characteristics of the IIR filter. As a result, it is possible to more effectively suppress noise.

Third Operation Mode (Only Integrator)

In a third operation mode, the first switched capacitor circuit 11 is allowed to operate as an integration circuit, and operations of the second switched capacitor circuit 12 and the integration circuit 13 are stopped, and thus the output VOUT1 of the first switched capacitor circuit 11 is output as an output of the detection circuit 301.

FIG. 11 is a timing chart illustrating an operation example of the above-described third operation mode (only integration circuit). As is the case with FIGS. 8 and 10, time is shown on the horizontal axis with an arbitrary unit, and signals (TX1 and TX2) for application of pulses to the Y electrodes and signals for on/off control of the above-described respective switches are shown in the vertical axis direction from an upper side. As described above with reference to FIG. 6, a plurality of pulses are sequentially applied to the Y electrodes. FIG. 11 illustrates parts of the plurality of pulses. 16 pulses are applied to the electrode Y1 from time t=0.5, and six pulses among the 16 pulses, which are applied to the electrode Y2 from time t=16.5, are shown. When a pulse is applied to the Y electrode, an electric charge corresponding to the intersection capacitor Cxy is input from the X electrode to the input terminal PX1 of the detection circuit 10_1.

The switch S2 of the first switched capacitor circuit 11 is closed in synchronization with the pulse that is applied to the Y electrode, and the electric charge that is input is transmitted to the integration capacitor Cs1. Whenever the electric charge is transmitted, the electric charge is accumulated in the integration capacitor Cs1, and is output to the VOUT1. The switch S1 discharges the electric charges accumulated in the integration capacitor Cs1 in a periodic manner similar to time t=0 to 0.5 and t=16 to 16.5. The output VOUT1 is retained in the sample-and-hold capacitor CSH through the switch SITG and the switch S4. The operations of the second switched capacitor circuit 12 and the integration circuit 13 are stopped, and particularly, an output of the operational amplifier AMPit3 of the integration circuit 13 is controlled to a high impedance.

As described above, in the third operation mode, the first switched capacitor circuit 11 is allowed to operate as an integration circuit, and is directly connected to the sample-and-hold circuit 14 by by-passing the second switched capacitor circuit 12 and the integration circuit 13. A configuration, in which only the integration circuit 13 is allowed to operate in a state in which the first switched capacitor circuit 11 and the second switched capacitor circuit are by-passed, may be employed.

Third Embodiment

Programmable SCF (Dual Edge Detection Type)

In the second embodiment, during rising of the pulse TX1 that is applied to the electrode Y1, an electric charge corresponding to the intersection capacitor Cxy is input from the detection electrode X1, and a variation amount of the intersection capacitor between touching and non-touching is detected on the basis of the signal charge. In contrast, in the third embodiment, electric charge migration, which occurs at a rising edge and a falling edge of the pulse TX1 that is applied to the electrode Y1, is detected to detect an amount of variation of the intersection capacitor between touching and non-touching.

Figure 12:
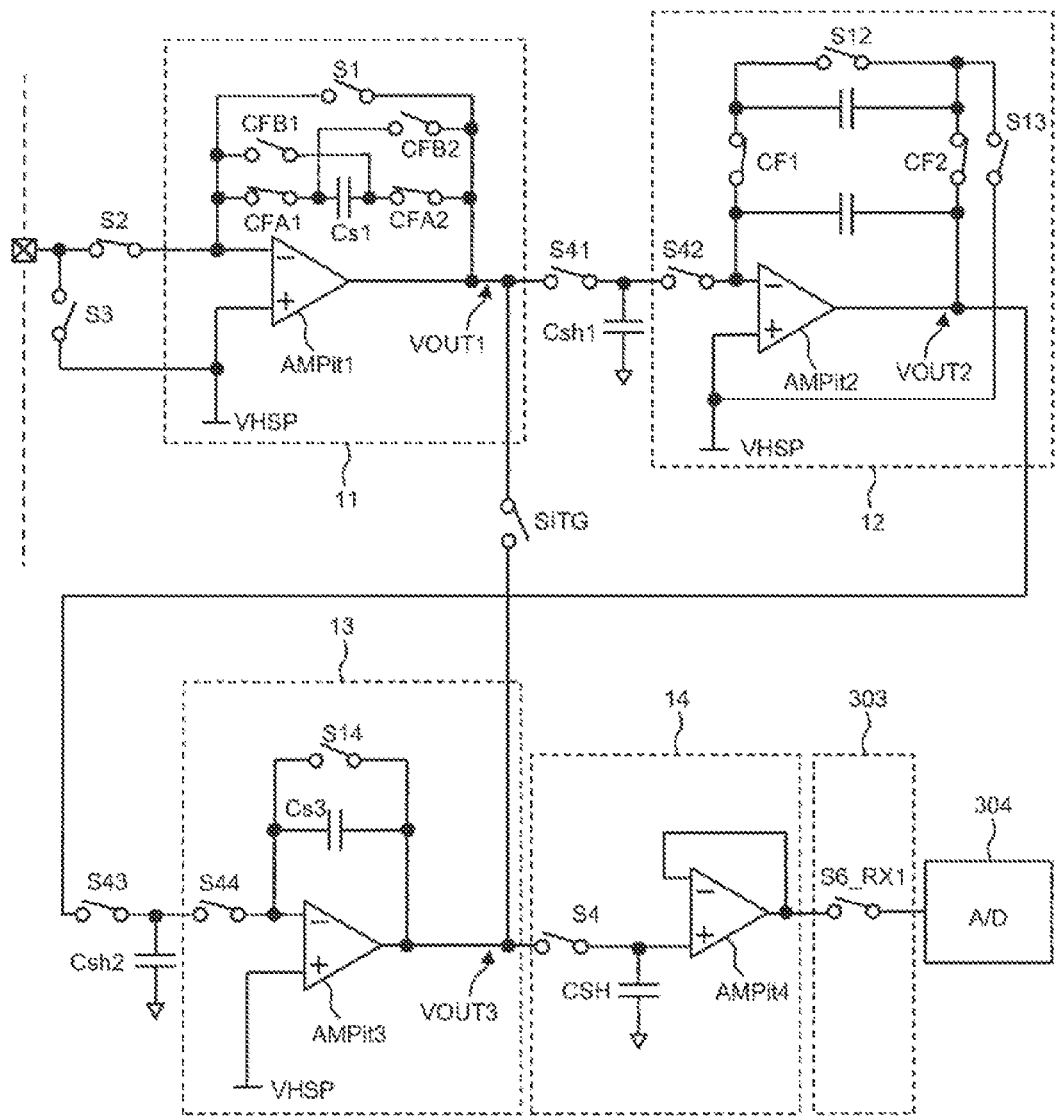
FIG. 12 is a circuit diagram illustrating a configuration example of a detection circuit (dual edge detection type) according to a third embodiment.

FIG. 12 is a circuit diagram illustrating a configuration example of a detection circuit (dual edge detection type) according to the third embodiment. As is the case with FIG. 7, FIG. 12 illustrates an example of a circuit configuration in which the detection circuit 301, the sample-and-hold circuit 302, and the selector 303 are connected to one detection electrode (X electrode). An input of a first switched capacitor circuit 11 is connected to the detection electrode (X electrode) X1 through the terminal PX1, and an output is transmitted to a second switched capacitor circuit 12 through a switch S41 and a sample-and-hold capacitor Csh1. An output of the second switched capacitor circuit 12 is transmitted to an integration circuit 13 through a switch S43 and a sample-and-hold capacitor Csh2. An output of the integration circuit 13 is connected to one sample-and-hold circuit 14, which constitutes the sample-and-hold circuit 302, through the switch S4. An output of the sample-and-hold circuit 14 is connected to the AD conversion circuit 304 through one switch S6_RX1 that constitutes the selector 303. An output of the first switched capacitor circuit 11 is connected to a switch S4, which is an input of the sample-and-hold circuit 14, through a switch SITG. The above-described respective switches, and respective switches, which are described later, in the first and second switched capacitor circuits 11 and 12 and the integration circuit 13 are controlled by the control signals Csig2 to Csig4 that are output from the sequence control circuit 308.

The first switched capacitor circuit 11 includes an operational amplifier AMPit1 in which a positive side input (+) is fixed to a predetermined potential (VHSP). The integration capacitor Cs1 and the switch S1 are connected in parallel with each other between a negative side input (−) and an output VOUT1 of the operational amplifier AMPit1. Switches CFA1, CFA2, CFB1, and CFB2 are connected to both ends of the integration capacitor Cs1, and have a configuration in which a connection relationship of the integration capacitor Cs1 with respect to the operational amplifier AMPit1 can be inverted. That is, the connection relationship of the integration capacitor Cs1 with respect to the operational amplifier AMPit1 can be inverted between a case where the switches CFA1 and CFA2 are closed and the switches CFB1 and CFB2 are opened, and a case where the switches CFA1 and CFA2 are opened and the switches CFB1 and CFB2 are closed. The other configurations are the same as that of the first switched capacitor circuit 11 shown in FIG. 7. A switch S2 is connected to between the input terminal PX1 and the negative side input (−) of the operational amplifier AMPit1, and the input terminal PX1 may be fixed to a predetermined potential VHSP by a switch S3.

As described later, the first switched capacitor circuit 11 can be allowed to operate as an FIR filter, a QV converter, or an integration circuit by appropriately controlling a timing of the switches S1 to S3, the switches CFA1, CFA2, CFB1, and CFB2, and the switch S41 that controls transmission to a sample-and-hold capacitor Csh1 of a subsequent stage.

The second switched capacitor circuit 12 and the integration circuit 13 are configured similar to FIG. 7, and description thereof will not be repeated.

The detection circuit 301 can be allowed to selectively operate in a total of six operation modes further including three operation modes in addition to the three operation modes disclosed in the second embodiment. As is the case with description in the second embodiment, it is suitable that selection of the operation modes is configured to appropriately set a control sequence of the above-described respective switches by providing the control register (CREG) 320 to the sequence control circuit (SQENC) 308.

In the first to third operation modes, the first switched capacitor circuit 11 is allowed to operate as an FIR filter, a QV conversion circuit, or an integration circuit of the single edge detection type as illustrated in the second embodiment. For operation of the single edge detection type, for example, a state, in which the switches CFA1 and CFA2 are closed, and the switches CFB1 and CFB2 are opened, is fixed, and then operation may be allowed in the same operation modes illustrated in the second embodiment.

In fourth to sixth operation modes, the first switched capacitor circuit 11 is allowed to operate as an FIR filter, a QV conversion circuit, or an integration circuit in a dual edge detection type. A period, for which the switch S2 is closed, is provided at a rising edge and a falling edge of the pulse TX1 that is applied to the electrode Y1, and the connection relationship of the integration capacitor Cs1 with respect to the operational amplifier AMPit1 is inverted between a rising period and a falling period. During rising and falling of the pulse TX1, a migration direction of a signal charge that is generated is inverted. Accordingly, when a polarity of an integration capacitor is inverted in accordance with the inversion of the migration direction, it is possible to detect a signal charge at both the rising edge and the falling edge of the pulse TX1. In the fourth to sixth operation modes, an amount of signal charges that are detected can be increased two times, and thus it is possible to improve touch detection sensitivity.

The fourth to sixth operation modes of the dual edge detection type will be described in more detail.

Fourth Operation Mode (Dual Edge Detection Type FIR+IIR+Integration Circuit)

In the fourth operation mode, as is the case with the first operation mode, the first switched capacitor circuit 11 is allowed to operate as an FIR filter, the second switched capacitor circuit 12 is allowed to operate as an IIR filter, and results thereof are output after being integrated (accumulatively added) in the integration circuit 13. However, the first switched capacitor circuit 11 of a first stage is allowed to operate as an FIR filter of a dual edge detection type.

Figure 13:
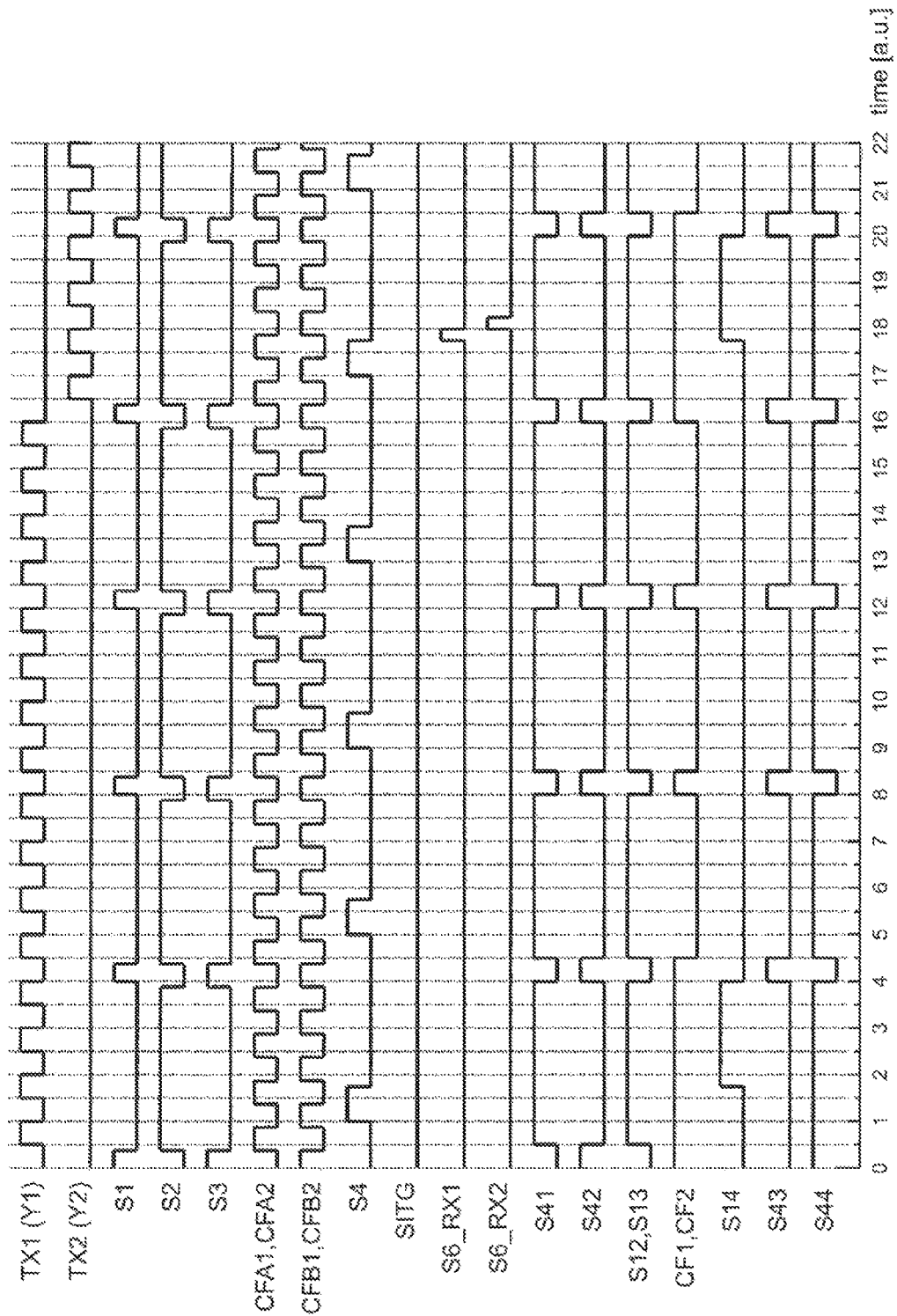
FIG. 13 is a timing chart illustrating a fourth operation mode (dual edge detection type FIR+IIR+integration circuit) of the detection circuit according to the third embodiment.

FIG. 13 is a timing chart illustrating an operation example of the fourth operation mode (dual edge detection type FIR+IIR+integration circuit). Time is shown on the horizontal axis with an arbitrary unit (a.u.), and signals (TX1 and TX2) for application of pulses to the Y electrodes and signals for on/off control of respective switches including the above-described switches CFA1, CFA2, CFB1, and CFB2 are shown in the vertical axis direction from an upper side. As described above with reference to FIG. 6, a plurality of pulses are sequentially applied to the Y electrodes, but as is the case with FIG. 8, parts thereof are shown in FIG. 13. 16 pulses are applied to the electrode Y1 from time t=0.5, and six pulses among the 16 pulses, which are applied to the electrode Y2 from time t=16.5, are shown. When a pulse is applied to the Y electrode, an electric charge corresponding to the intersection capacitor Cxy is input from the X electrode to the input terminal PX1 of the detection circuit 10_1. Here, the dual edge detection type uses a configuration in which migration of the electric charge occurs at each of a rising edge and a falling edge of the pulse that is applied to the Y electrode, and migration directions thereof are opposite to each other.

Before the rising edge of the pulse that is applied to the Y electrode (at time t=0.5−α), the switch S2 of the first switched capacitor circuit 11 is closed, the switches CFA1 and CFA2 are closed, and the switches CFB1 and CFB2 are opened. At time t=0.5, a signal charge, which occurs in accordance with the rising of the pulse that is applied to the Y electrode and which is input from the X electrode, is transmitted to the integration capacitor Cs1. Next, before the falling edge of the pulse that is applied to the Y electrode (at time t=1.0−α), the switches CFA1 and CFA2 are opened, and the switches CFB1 and CFB2 are closed, and thus a connection relationship of the integration capacitor Cs1 with respect to the operational amplifier AMPit1 is inverted. It can be said that the polarity of the integration capacitor Cs1 is inverted. At time t=1.0, a signal charge, which occurs in accordance with the falling of the pulse that is applied to the Y electrode, and which is input from the X electrode, is transmitted to the integration capacitor Cs1 that is inverted. Subsequently, control of closing the switches CFA1 and CFA2 and opening the switches CFB1 and CFB2 in synchronization with a rising edge (time t=1.5, 2.5, 3.5) of a pulse that is applied to the Y electrode (before the edge), and control of opening the switches CFA1 and CFA2 and closing the switches CFB1 and CFB2 in synchronization with a falling edge (time t=2, 3, 4) (before the edge) of the pulse are repeated in the same manner. A migration direction of a signal charge, which occurs in accordance with the rising and falling of the pulse applied to the Y electrode and which is input from the X electrode, is inverted between the rising and falling thereof. A signal charge that is input from the X electrode is detected at both edges of the pulse, and is accumulatively added to the integration capacitor Cs1 as an absolute value. The switch S41 is closed for a period of time t=0.5 to 4, and the output VOUT1 is transmitted to the sample-and-hold capacitor Csh1. An output of the first switched capacitor circuit 11, which is retained in the sample-and-hold capacitor Csh1, is input to the second switched capacitor circuit 12 at time t=4 by the switch S42. Electric charges that are accumulated in the integration capacitor Cs1 are transmitted to the sample-and-hold capacitor Csh1, and then are discharged and initialized by the switch S1. Subsequently, as is the case with the above-described sequence, the first switched capacitor circuit 11 operates as an FIR filter, that is, the first switched capacitor circuit 11 integrates electric charges which are periodically input to the terminal PX1 in synchronization with a rising edge and a falling edge of a pulse applied to the Y electrode and which correspond to four pulse periods, and outputs the integrated electric charges to the sample-and-hold capacitor Csh1 for every four pulse periods.

Operations of the second switched capacitor circuit 12 and the integration circuit 13 of subsequent stages are the same as the first operation mode (single edge detection type FIR+IIR+integration circuit) described with reference to FIG. 8, and thus description thereof will not be repeated.

In the fourth operation mode (dual edge detection type FIR+IIR+integration circuit), an amount of signal charges that are input to the FIR filter of the first stage can be doubled in comparison to the first operation mode, and thus it is possible to improve touch detection sensitivity.

Fifth Operation Mode (Dual Edge Detection Type QV Conversion+IIR+Integration Circuit)

In the fifth operation mode, as is the case with the second operation mode, the first switched capacitor circuit 11 is allowed to operate as a QV conversion circuit, the second switched capacitor circuit 12 is allowed to operate as an IIR filter, and results thereof are output after being integrated (accumulatively added) in the integration circuit 13. However, the first switched capacitor circuit 11 of the first stage is allowed to operate as a QV conversion circuit of a dual edge detection type.

Figure 14:
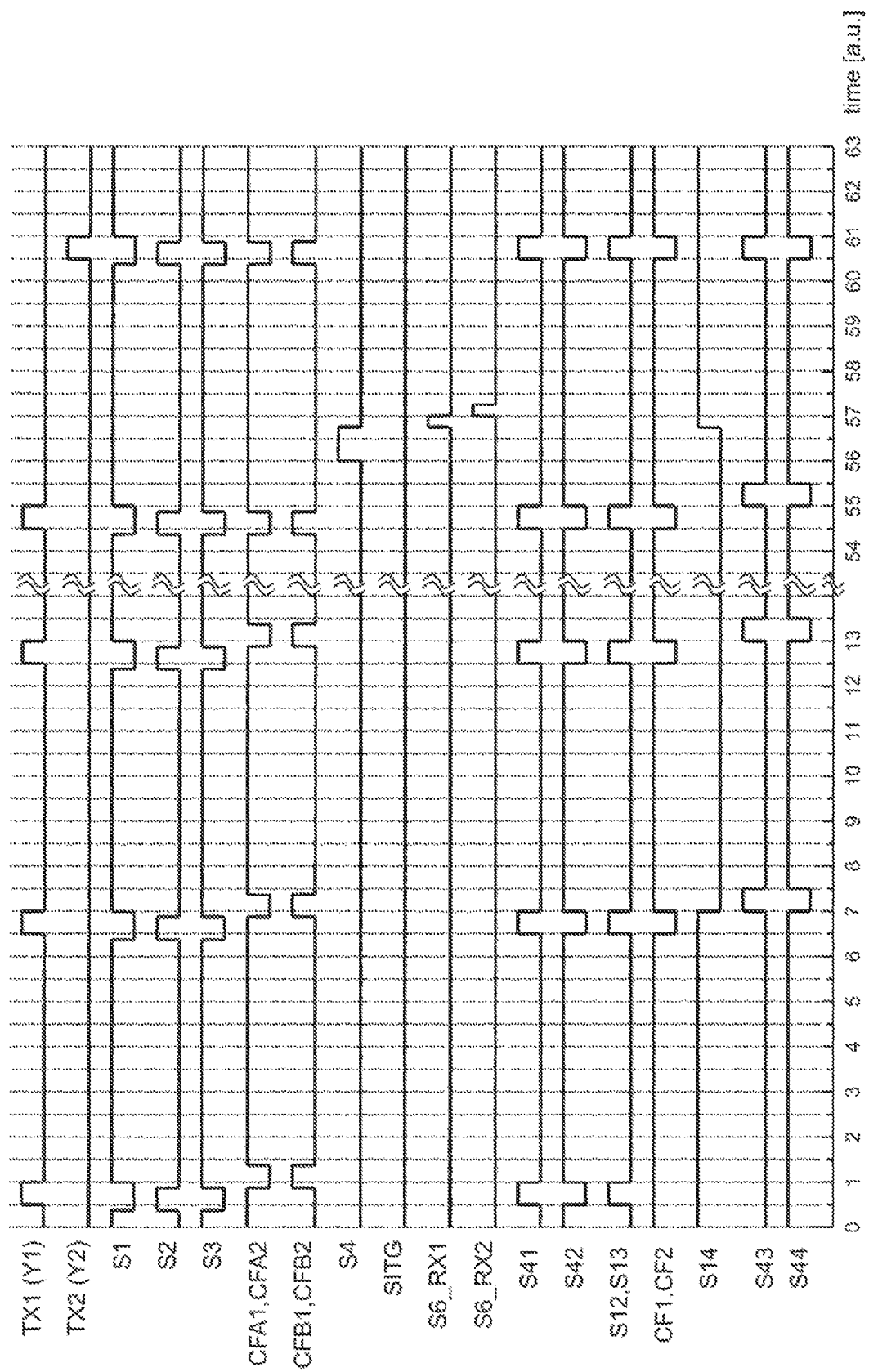
FIG. 14 is a timing chart illustrating a fifth operation mode (dual edge detection type QV conversion+IIR+integration circuit) of the detection circuit according to the third embodiment.

FIG. 14 is a timing chart illustrating an operation example of the fifth operation mode (dual edge detection type QV conversion+IIR+integration circuit). As is the case with FIG. 13, time is shown on the horizontal axis with an arbitrary unit (a.u.), and signals (TX1 and TX2) for application of pulses to the Y electrodes and signals for on/off control of respective switches including the above-described switches CFA1, CFA2, CFB1, and CFB2 are shown in the vertical axis direction from an upper side. Optionally, a plurality of pulses, in which a low period is longer than that in the description with reference to FIG. 6, are sequentially applied to the Y electrodes, but as is the case with FIG. 10, parts thereof are shown in FIG. 14. At time t=0.5, t=6.5, t=12.5, . . . t=54.5, nine pulses are applied to the electrode Y1, and one pulse among nine pulses, which are applied to the electrode Y2 from time t=60.5, is shown. When a pulse is applied to the Y electrode, an electric charge corresponding to the intersection capacitor Cxy is input from the X electrode to the input terminal PX1 of the detection circuit 10_1. Here, the dual edge detection type uses a configuration in which migration of the electric charge occurs at each of a rising edge and a falling edge of the pulse that is applied to the Y electrode, and migration directions thereof are opposite to each other.

Before the rising edge (time t=0.5) of the pulse that is applied to the Y electrode, the switch S2 of the first switched capacitor circuit 11 is closed, the switches CFA1 and CFA2 are closed, and the switches CFB1 and CFB2 are opened. At time t=0.5, a signal charge, which occurs in accordance with the rising of the pulse that is applied to the Y electrode and which is input from the X electrode, is transmitted to the integration capacitor Cs1. Next, before the falling edge (time t=1.0) of the pulse that is applied to the Y electrode, the switches CFA1 and CFA2 are opened, and the switches CFB1 and CFB2 are closed, and thus a connection relationship of the integration capacitor Cs1 with respect to the operational amplifier AMPit1 is inverted (a polarity of an integration capacitor Cs1 is inverted). At time t=1.0, a signal charge, which occurs in accordance with the falling of the pulse that is applied to the Y electrode, and which is input from the X electrode, is transmitted to the integration capacitor Cs1 that is inverted, and is accumulatively added to the electric charge that is transmitted at the rising edge. The switch S41 is closed for a period of time t=0.5 to 1, and the output VOUT1 is transmitted to the sample-and-hold capacitor Csh1. An output of the first switched capacitor circuit 11, which is retained in the sample-and-hold capacitor Csh1, is input to the second switched capacitor circuit 12 at time t=1 by the switch 342. Electric charges that are accumulated in the integration capacitor Cs1 are transmitted to the sample-and-hold capacitor Csh1, and then are discharged and initialized by the switch S1. With regard to a signal charge which is input to the Y electrode and corresponds to one pulse, absolute values of electric charges detected at both rising and falling edges are summed up. The resultant added value is output to VOUT1 for every one pulse, and is transmitted to the sample-and-hold capacitor Csh1 and is retained therein. The first switched capacitor circuit 11 operates as a QV conversion circuit that converts an electric charge Q, which is input, to a voltage V. The first switched capacitor circuit 11 periodically converts an electric charge input to the terminal PX1 to a voltage VOUT in synchronization with a pulse that is applied to the Y electrode, and outputs the converted voltage to the sample-and-hold capacitor Csh1 for every one pulse.

Operations of the second switched capacitor circuit 12 and the integration circuit 13 of subsequent stages are the same as the second operation mode (single edge detection type QV conversion+IIR+integration circuit) described with reference to FIG. 10, and thus description thereof will not be repeated.

In the fifth operation mode (dual edge detection type QV conversion+IIR+integration circuit), an amount of signal charges that are input to the QV conversion circuit of the first stage can be doubled in comparison to the second operation mode, and thus it is possible to improve touch detection sensitivity.

Sixth Operation Mode (Only Dual Edge Detection Type Integrator)

In the sixth operation mode, as is the case with the third operation mode, the first switched capacitor circuit 11 is allowed to operate as an integration circuit, and operations of the second switched capacitor circuit 12 and the integration circuit 13 are stopped, and thus the output VOUT1 of the first switched capacitor circuit 11 is output as an output of the detection circuit 301. However, the first switched capacitor circuit 11 is allowed to operate as a dual edge detection type integration circuit.

Figure 15:
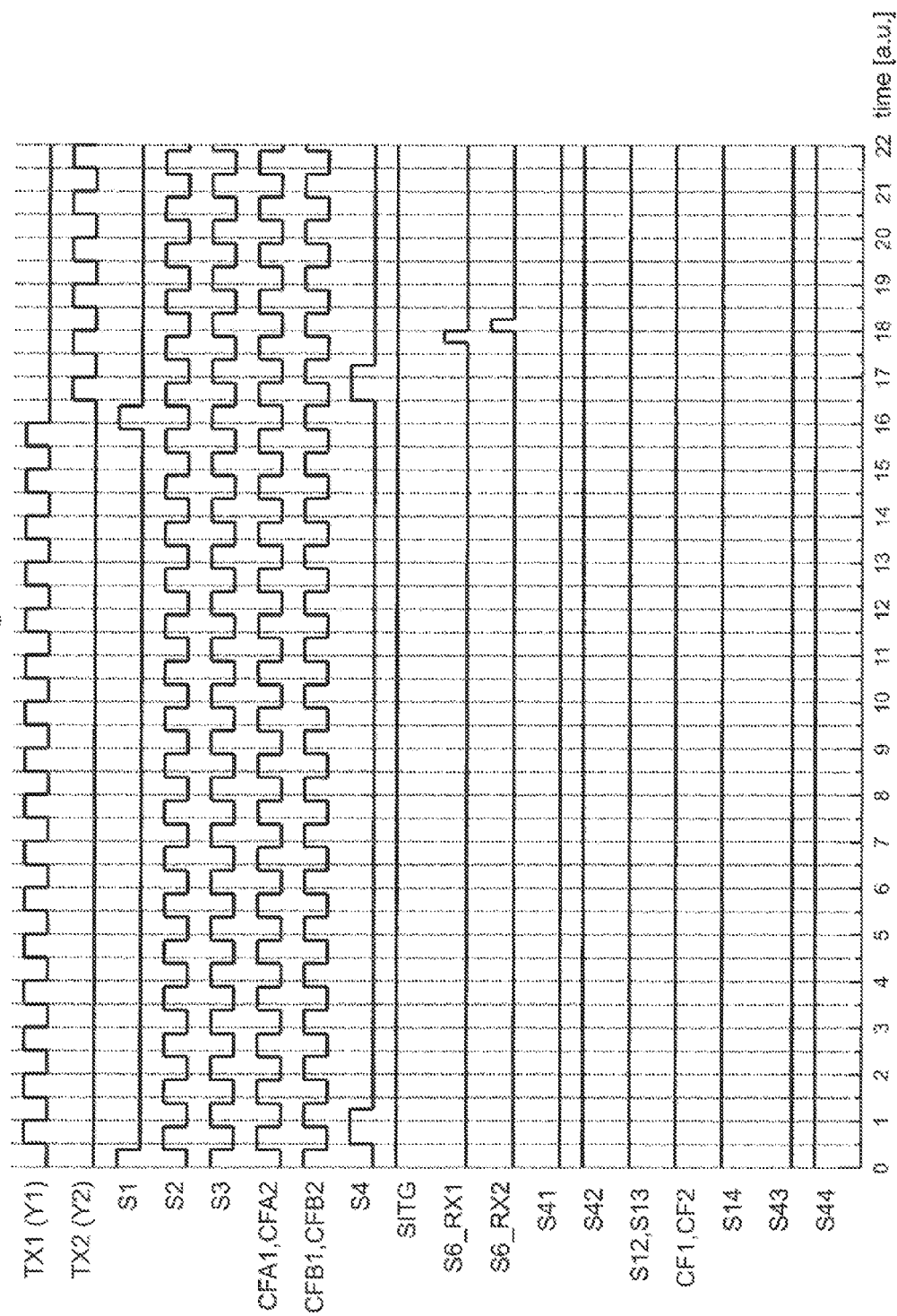
FIG. 15 is a timing chart illustrating a sixth operation mode (only of a dual edge detection type integration circuit) of the detection circuit according to the third embodiment.

FIG. 15 is a timing chart illustrating an operation example of the sixth operation mode (only dual edge detection type integrator). As is the case with FIGS. 13 and 14, time is shown on the horizontal axis with an arbitrary unit (a.u.), and signals (TX1 and TX2) for application of pulses to the Y electrodes and signals for on/off control of respective switches including the above-described switches CFA1, CFA2, CFB1, and CFB2 are shown in the vertical axis direction from an upper side. As described above with reference to FIG. 6, a plurality of pulses are sequentially applied to the Y electrodes, but as is the case with FIG. 11, parts thereof are shown in FIG. 15. 16 pulses are applied to the electrode Y1 from time t=0.5, and six pulses among the 16 pulses, which are applied to the electrode Y2 from time t=16.5, are shown. When a pulse is applied to the Y electrode, an electric charge corresponding to the intersection capacitor Cxy is input from the X electrode to the input terminal PX1 of the detection circuit 10_1. Here, the dual edge detection type uses a configuration in which migration of the electric charge occurs at each of a rising edge and a falling edge of the pulse that is applied to the Y electrode, and migration directions thereof are opposite to each other.

Before the rising edge of the pulse that is applied to the Y electrode (at time t=0.5−α), the switch S2 of the first switched capacitor circuit 11 is closed, the switches CFA1 and CFA2 are closed, and the switches CFB1 and CFB2 are opened. At time t=0.5, a signal charge, which occurs in accordance with the rising of the pulse that is applied to the Y electrode and which is input from the X electrode, is transmitted to the integration capacitor Cs1. Next, before the falling edge of the pulse that is applied to the Y electrode (at time t=1.0−α), the switches CFA1 and CFA2 are opened, and the switches CFB1 and CFB2 are closed, and thus a connection relationship of the integration capacitor Cs1 with respect to the operational amplifier AMPit1 is inverted (a polarity of an integration capacitor Cs1 is inverted). At time t=1.0, a signal charge, which occurs in accordance with the falling of the pulse that is applied to the Y electrode, and which is input from the X electrode, is transmitted to the integration capacitor Cs1 that is inverted, and is accumulatively added to the electric charge that is transmitted at the rising edge. Subsequently, control of closing the switches CFA1 and CFA2 and opening the switches CFB1 and CFB2 in synchronization with a rising edge (time t=1.5, 2.5, 3.5, . . . 15.5) of a pulse that is applied to the Y electrode (before the edge), and control of opening the switches CFA1 and CFA2 and closing the switches CFB1 and CFB2 in synchronization with a falling edge (time t=2, 3, 4, . . . 16) (before the edge) of the pulse are repeated in the same manner. A migration direction of a signal charge, which occurs in accordance with the rising and falling of the pulse applied to the Y electrode and which is input from the X electrode, is inverted between the rising and falling thereof. A signal charge that is input from the X electrode is detected at both edges of the pulse, is accumulatively added to the integration capacitor Cs1 as an absolute value, and is output to VOUT1. The switch S1 periodically discharges electric charges that are accumulated in the integration capacitor Cs1. The output VOUT1 is retained in the sample-and-hold capacitor CSH by the switch SITG and the switch S4. Operations of the second switched capacitor circuit and the integration circuit 13 are stopped, and particularly, an output of the operational amplifier AMPit3 of the integration circuit 13 is controlled to a high impedance.

As described above, in the sixth operation mode, as is the case with the third operation mode, the first switched capacitor circuit 11 is allowed to operate as an integration circuit, and is directly connected to the sample-and-hold circuit 14 by by-passing the second switched capacitor circuit 12 and the integration circuit 13. In the sixth operation mode, an amount of signal charges, which are input to the first switched capacitor circuit 11 that operates as the integration circuit, can be doubled in comparison to the third operation mode, and thus it is possible to improve touch detection sensitivity.

Hereinbefore, the invention has been described in detail with reference to the embodiments, but the invention is not limited thereto, and various modifications can be made in a range not departing from the gist of the invention.

For example, the display panel (DP) 2 may be a liquid crystal display panel, an organic EL display panel, and other display panels of arbitrary types. In addition, the liquid crystal display panel may be either an amorphous silicon type liquid crystal display panel or a low-temperature polysilicon type liquid crystal display panel.

What is claimed is:

1. A touch panel control circuit configured to connect to a touch panel comprising a first plurality of electrodes arranged in a first direction and a second plurality of electrodes arranged in a second direction, wherein the first plurality of electrodes intersect the second plurality of electrodes to form a plurality of intersection capacitors, the touch panel control circuit comprising:

a plurality of drive circuits configured to drive the first plurality of electrodes; and a plurality of detection circuits coupled to the second plurality of electrodes, each detection circuit of the plurality of detection circuits including a corresponding switched capacitor circuit and a corresponding integration circuit coupled to an output node of the corresponding switched capacitor circuit, wherein the detection circuits of the plurality of detection circuits are configured to detect a plurality of capacitance values of the plurality of intersection capacitors, wherein the drive circuits of the plurality of drive circuits are configured to apply a first number of pulses, the first number being at least two, to the first plurality of electrodes within a predetermined period, wherein each switched capacitor circuit is configured to receive an input signal from the second plurality of electrodes and to operate with a sampling frequency which is same or multiple times higher than a frequency of the pulses and in synchronization with the pulses, and wherein each integration circuit is configured to operate in synchronization with the pulses.

2. The touch panel control circuit of claim 1, wherein:

each switched capacitor circuit includes a first switched capacitor sub-circuit configured to receive the input signal, and a second switched capacitor sub-circuit configured to receive a first output signal of the first switched capacitor sub-circuit and configured to output a second output signal to the corresponding integration circuit, the first switched capacitor sub-circuit is configured to operate as a finite impulse response (FIR) filter configured to sample the first number of times in the predetermined period and having an order of a second number that is one or more less than the first number, and the second switched capacitor sub-circuit is configured to operate as a switched capacitor filter that samples a third number of times in the predetermined period, the third number being equal to the first number divided by the second number.

3. The touch panel control circuit according to claim 2, wherein:

the switched capacitor filter of the second switched capacitor sub-circuit is an infinite impulse response (IIR) filter.

4. The touch panel control circuit according to claim 1, wherein:

the switched capacitor circuit includes a first switched capacitor sub-circuit to which the input signal is input, and a second switched capacitor sub-circuit to which a first output signal of the first switched capacitor circuit is input and which outputs a second output signal to the corresponding integration circuit, the first switched capacitor sub-circuit is configured to operate as a QV conversion circuit that converts an amount of electric charge that is input the first number of times in the predetermined period to a voltage and outputs the voltage, and the second switched capacitor sub-circuit is configured to operate as an IIR filter that samples the first number of times in the predetermined period.

5. The touch panel control circuit according to claim 1, wherein:

the switched capacitor circuit includes a first switched capacitor sub-circuit to which the input signal is input, and a second switched capacitor sub-circuit to which a first output signal of the first switched capacitor sub-circuit is input and which outputs a second output signal to the corresponding integration circuit, the first switched capacitor sub-circuit is configured to operate in one configuration of a first set of configurations that includes: an FIR filter having an order that is a second number less than the first number, the second number being one or more, the FIR filter configured to sample the first number of times in the predetermined period; a QV conversion circuit configured to convert an amount of electric charge that is input the first number of times in the predetermined period from the input signal to a voltage and to output the voltage; and a switched capacitor integration circuit configured to integrate an amount of electric charge that is input the first number of times in the predetermined period from the input signal and to output a corresponding voltage, the second switched capacitor sub-circuit is configured to operate in one configuration of a second set of configurations that includes: an IIR filter that samples a third number of times in the predetermined period, the third number being the first number divided by the second number; and an IIR filter configured to sample the first number of times in the predetermined period, and the touch panel control circuit is configured to select a configuration of the first set of configurations for operation of the first switched capacitor sub-circuit and to select a configuration of the second set of configurations for operation of the second switched capacitor sub-circuit.

6. The touch panel control circuit according to claim 1, wherein:

the switched capacitor circuit includes a first switched capacitor sub-circuit to which the input signal is input, and a second switched capacitor sub-circuit to which a first output signal of the first switched capacitor sub-circuit is input and that outputs a second output signal to the corresponding integration circuit, the first switched capacitor sub-circuit is configured to operate as the integration circuit corresponding to the switched capacitor circuit, the integration circuit being configured to integrate a first set of electric charge input from within the input signal that is input in response to one edge of each of the first number of pulses in the predetermined period and an amount of electric charge input from the input signal that is input in response to another edge of each of the first number of pulses, and the touch panel control circuit is configured to output a third output signal of the first switched capacitor sub-circuit from the detection circuits by stopping operation of the second switched capacitor sub-circuit and the corresponding integration circuit.

7. The touch panel control circuit according to claim 1, wherein:

the switched capacitor circuit includes a first switched capacitor sub-circuit to which the input signal is input, and a second switched capacitor sub-circuit to which a first output signal of the first switched capacitor sub-circuit is input and that outputs a second output signal to the corresponding integration circuit, the first switched capacitor sub-circuit is configured to operate as an FIR filter having an order of a second number less than the first number, the second number being an even number, the FIR filter being configured to integrate an amount of electric charge input from within the input signal that is input in response to one edge of each of the first number of pulses in the predetermined period and an amount of electric charge input from within the input signal that is input in response to another edge of the first number of pulses, and the second switched capacitor sub-circuit is configured to operate as a switched capacitor filter that samples a third number of times in the predetermined period, wherein the third number is equal to two times the first number divided by the second number.

8. The touch panel control circuit according to claim 7, wherein:

the switched capacitor filter of the second switched capacitor sub-circuit comprises an IIR filter.

9. The touch panel control circuit according to claim 1, wherein:

the switched capacitor circuit includes a first switched capacitor sub-circuit to which the input signal is input, and a second switched capacitor sub-circuit to which a first output signal of the first switched capacitor sub-circuit is input and which outputs a second output signal to the corresponding integration circuit, the first switched capacitor sub-circuit is configured to operate as a QV conversion circuit that converts an amount of electric charge input from within the input signal that is input in response to one edge of each of the first number of pulses in the predetermined period and an amount of electric charges input from within the input signal that is input in response to another edge to voltages in which one polarity is inverted and becomes equal to the other polarity, and which outputs the voltages, and the second switched capacitor sub-circuit is configured to operate as an IIR filter that samples a second number of times in the predetermined period, where the second number is two times the first number.

10. The touch panel control circuit according to claim 1, wherein:

the switched capacitor circuit includes a first switched capacitor sub-circuit to which the input signal is input, and a second switched capacitor sub-circuit to which a first output signal of the first switched capacitor sub-circuit is input, which outputs a second output signal to the corresponding integration circuit, and is configured to operate in at least two operation modes of a first operation mode, a second operation mode, a third operation mode, a fourth operation mode, a fifth operation mode, and a sixth operation mode, in the first operation mode, the first switched capacitor sub-circuit is configured to operate as an integration circuit that integrates an amount of electric charge that are input a first number of times in the predetermined period from the input signal that which outputs a corresponding voltage, operations of the second switched capacitor sub-circuit and the corresponding integration circuit are stopped, and a third output of the first switched capacitor sub-circuit is output from a corresponding detection circuit of the plurality of detection circuits, in the second operation mode, the first switched capacitor sub-circuit is configured to operate as an FIR filter having an order that is a second number less than the first number, the second number being an even number, the FIR filter configured to sample the first number of times in the predetermined period, and the second switched capacitor sub-circuit is configured to operate as an IIR filter that samples a third number of times in the predetermined period, the third number being the first number divided by the second number, in the third operation mode, the first switched capacitor sub-circuit is configured to operate as a QV conversion circuit that converts an amount of electric charge that is input a first number of times in the predetermined period from the input signal to a voltage and outputs the voltage, and the second switched capacitor circuit is configured to operate as an IIR filter that samples the first number of times in the predetermined period, in the fourth operation mode, the first switched capacitor sub-circuit is configured to operate as an switched capacitor integration circuit that integrates an amount of electric charge input from within the input signal that is input in response to one edge of each of the first number of pulses in the predetermined period and an amount of electric charge input from within the input signal that is input in response to another edge of the first number of pulses, the operations of the second switched capacitor sub-circuit and the integration circuit are stopped, and an output of the first switched capacitor sub-circuit is output from the detection circuit, in the fifth operation mode, the first switched capacitor sub-circuit is allowed to operate as an FIR filter having an order of a second number smaller than the first number, the second number being an even number, the FIR filter integrating an amount of electric charge input from the input signal that is input in response to one edge of each of the first number of pulses in the predetermined period and an amount of electric charge input from the input signal that is input in response to another edge, and the second switched capacitor sub-circuit is configured to operate as a switched capacitor filter that samples a third number of times in the predetermined period, the third number being two times a first number divided by a second number, and in the sixth operation mode, the first switched capacitor sub-circuit is configured to operate as a QV conversion circuit that converts an amount of electric charge input from the input signal that is input in response to one edge of each of the first number of pulses in the predetermined period and an amount of electric charge input from the input signal that is input in response to the other edge to voltages in which one polarity is inverted and becomes equal to the other polarity, and which outputs the voltages, and the second switched capacitor sub-circuit is configured to operate as an IIR filter that samples a fourth number of times in the predetermined period, the fourth number being two times the first number.

11. The touch panel control circuit according to claim 1, wherein:

the plurality of drive circuits and the plurality of detection circuits are included on a single semiconductor substrate.

12. The touch panel control circuit according to claim 11, further comprising:

a display drive circuit included on the single semiconductor substrate, the display drive circuit configured to be coupled to a display panel that is configured to overlap the touch panel.

13. The touch panel control circuit according to claim 12, further comprising:

a microcontroller included on the single semiconductor substrate, the microcontroller configured to control the touch panel control circuit and to read out data based on output of the detection circuit.

14. A touch panel control circuit configured to connect to a touch panel comprising a first plurality of electrodes arranged in a first direction and a second plurality of electrodes arranged in a second direction, wherein the first plurality of electrodes intersect the second plurality of electrodes to form a plurality of intersection capacitors, the touch panel control circuit comprising:

a plurality of drive circuits configured to drive the first plurality of electrodes by applying a first number of pulses to the first plurality of electrodes in a predetermined period;

a plurality of detection circuits coupled to the second plurality of electrodes, each detection circuit of the plurality of detection circuits configured to detect a capacitance value of a corresponding intersection capacitor of the plurality of intersection capacitors; and a sequence control circuit, wherein each detection circuit includes a first switched capacitor circuit that is coupled to each input terminal capable of being connected to the first plurality of electrodes, a first sample-and-hold circuit, a second switched capacitor circuit, a second sample-and-hold circuit, an integration circuit, and a third sample-and-hold circuit that retains an output of the detection circuit that are coupled in series, wherein the first switched capacitor circuit includes a first operational amplifier in which a first positive side input is fixed to a first predetermined potential, a first integration capacitor that is coupled between a first negative side input and a first output of the first operational amplifier, a first switch that is coupled between the first negative side input and the first output of the first operational amplifier, and a second switch that is coupled between the input terminal and the first negative side input of the first operational amplifier, wherein the second switched capacitor circuit includes a second operational amplifier in which a second positive side input is fixed to a second predetermined potential, a second integration capacitor that is coupled between a second negative side input and a second output of the second operational amplifier, and has a configuration in which a part or the entirety of a capacitance value is capable of being discharged by control, and a fourth switch that is coupled between an output of the first sample-and-hold circuit and the second negative side input of the second operational amplifier, wherein the integration circuit includes a third operational amplifier in which a third positive side input is fixed to a predetermined potential, a third integration capacitor that is coupled between a third negative side input and a third output of the third operational amplifier, a third switch that is coupled between the third negative side input and the third output of the third operational amplifier, and a fifth switch that is coupled between an output of the second sample-and-hold circuit and the third negative side input of the third operational amplifier, and wherein the sequence control circuit is configured to control a timing of turning on or off the first switch, the second switch, the third switch, the fourth switch, and the fifth switch of the detection circuit and a timing of discharging a part or the entirety of the second integration capacitor in synchronization with a timing of outputting the pulses with respect to the drive circuit.

15. The touch panel control circuit according to claim 14, wherein:

the first switched capacitor circuit is configured to perform control of inverting a connection direction of the first integration capacitor, and the sequence control circuit is configured to control the timing of turning on or off the first switch, the second switch, the third switch, the fourth switch, and the fifth switch of the detection circuit, the timing of discharging a part or the entirety of the second integration capacitor, and a timing of inverting the connection direction of the first integration capacitor in synchronization with a rising edge and a falling edge of the pulses that are output to the drive circuit.

16. The touch panel control circuit according to claim 14, further comprising:

an analog-to-digital conversion circuit; and a selection circuit that selects one voltage from a plurality of voltages retained in the third sample-and-hold circuit and supplies the selected voltage to the analog-to-digital conversion circuit, wherein the sequence control circuit is configured to control the plurality of drive circuits in order for the pulses to be sequentially applied to the first plurality of electrodes in a predetermined period to allow the plurality of detection circuits to operate in parallel for every predetermined period, and to control the selection circuit in order for outputs of the plurality of detection circuits to be sequentially supplied to the analog-to-digital conversion circuit.

17. The touch panel control circuit according to claim 14, wherein:

the plurality of drive circuits, the plurality of detection circuits, and the sequence control circuit are included on a single semiconductor substrate.

18. The touch panel control circuit according to claim 17, further comprising:

a display drive circuit included on the single semiconductor substrate, wherein the display drive circuit is configured to be coupled to a display panel that is configured to overlap the touch panel.

19. The touch panel control circuit according to claim 18, further comprising:

a microcontroller included on the single semiconductor substrate, wherein the microcontroller is configured to control the touch panel control circuit and to read out data based on output of the detection circuit.

* * * * *

UNITED STATES PATENT AND TRADEMARK OFFICE
CERTIFICATE OF CORRECTION

PATENT NO. : 9,437,169 B2
APPLICATION NO. : 14/567386
DATED : September 6, 2016
INVENTOR(S) : Takayuki Noto and Akihito Akai It is certified that error appears in the above-identified patent and that said Letters Patent is hereby corrected as shown below:

On the Title Page

Column 1 (Assignee) Line 1, delete "Synpatics" and insert -- Synaptics --, therefor.

Column 1 (Assignee) Line 1, delete "Tokoyo" and insert -- Tokyo --, therefor.

Signed and Sealed this
Sixth Day of March, 2018

Andrei Iancu
*Director of the United States Patent and Trademark Office*